United States Patent [19]

Silverbrook et al.

[11] Patent Number: 5,677,644
[45] Date of Patent: Oct. 14, 1997

[54] RAMP GENERATING STRUCTURE FOR PRODUCING COLOR GRAPHICS

[75] Inventors: Kia Silverbrook, Wollahra; James Robert Metcalf, Collaroy Plateau, both of Australia

[73] Assignees: Canon Kabushiki Kaisha, Tokyo, Japan; Canon Information Systems Research Australia Pty. Ltd., Australia

[21] Appl. No.: 469,679

[22] Filed: Jun. 6, 1995

Related U.S. Application Data

[62] Division of Ser. No. 725,621, Jul. 3, 1991, Pat. No. 5,459,823.

[30] Foreign Application Priority Data

| Jul. 5, 1990 | [AU] | Australia | PK 1023 |
| Nov. 19, 1990 | [AU] | Australia | PK 3419 |

[51] Int. Cl.⁶ ............................................. H03K 4/06
[52] U.S. Cl. .................. 327/131; 327/134; 327/135; 327/137; 395/131
[58] Field of Search ............................. 327/126, 131, 327/134, 135, 137, 130; 395/131, 130

[56] References Cited

U.S. PATENT DOCUMENTS

| 3,456,554 | 7/1969 | Goodwin | 327/126 |
| 3,487,214 | 12/1969 | Vossberg | 327/126 |
| 3,628,061 | 12/1971 | Jackman | 327/126 |
| 3,689,914 | 9/1972 | Butler | 327/134 |
| 3,810,039 | 5/1974 | Fein | 327/131 |
| 3,919,649 | 11/1975 | Logemann, Jr. | 327/126 |
| 4,328,554 | 5/1982 | Mantione | 364/721 |
| 4,504,741 | 3/1985 | Armitage | 307/228 |
| 4,589,013 | 5/1986 | Vlahos et al. | 358/22 |
| 4,657,657 | 4/1987 | Jefferson | 327/126 |
| 4,811,084 | 3/1989 | Belmares-Sarabia et al. | 358/22 |
| 4,823,183 | 4/1989 | Jackson et al. | 358/22 |
| 4,827,253 | 5/1989 | Maltz | 340/734 |
| 4,851,709 | 7/1989 | Bailey | 327/126 |
| 4,954,912 | 9/1990 | MacDonald et al. | 358/948 |
| 4,965,745 | 10/1990 | Economy et al. | 395/131 |
| 5,003,491 | 3/1991 | Heckt | 358/22 |
| 5,039,872 | 8/1991 | Oldham | 327/126 |

FOREIGN PATENT DOCUMENTS

| 2217127 | 10/1989 | United Kingdom . |
| WO89/06396 | 7/1989 | WIPO . |

OTHER PUBLICATIONS

New Electronics, Mar. 1989, pp. 59–60, Horton, et al., "Device choice for image capture and processing".
1990 IEEE International Symposium On Circuits and Systems, vol. 1, May 1, 1990, pp. 73–76, Bang, et al., "ESEU: A Hardware Architecture For Fast Image Generation".
Computer Technology Review, vol. VII, No. 13, 1987, pp. 81–83, Peddie, "Extensive Graphics Workstation Capabilities Fit On A Single Board".
Operating Systems Review, vol. 24, No. 2, Apr. 1990, pp. 19–34, Hopper, "Pandora —an experimental system for multimedia applications".

*Primary Examiner*—Terry Cunningham
*Attorney, Agent, or Firm*—Fitzpatrick, Cella, Harper & Scinto

[57] ABSTRACT

A graphics engine is disclosed which can be used in a color desktop publishing system. The graphics engine accepts 32-bit RGBM data and performs pixel level calculations under computer control to output processed 32-bit RGBM data. The engine comprises a render processor interface, a run controller including a ramp generator, and a control unit. Interpolators are provided for each color (RGB) and cascaded with corresponding compositors. A transparency interpolator and matte combiner alter the matte plane of the video image. The engine can output data suitable for rendering by a color laser printer for a full size A3 page at 400 dots per inch.

7 Claims, 14 Drawing Sheets

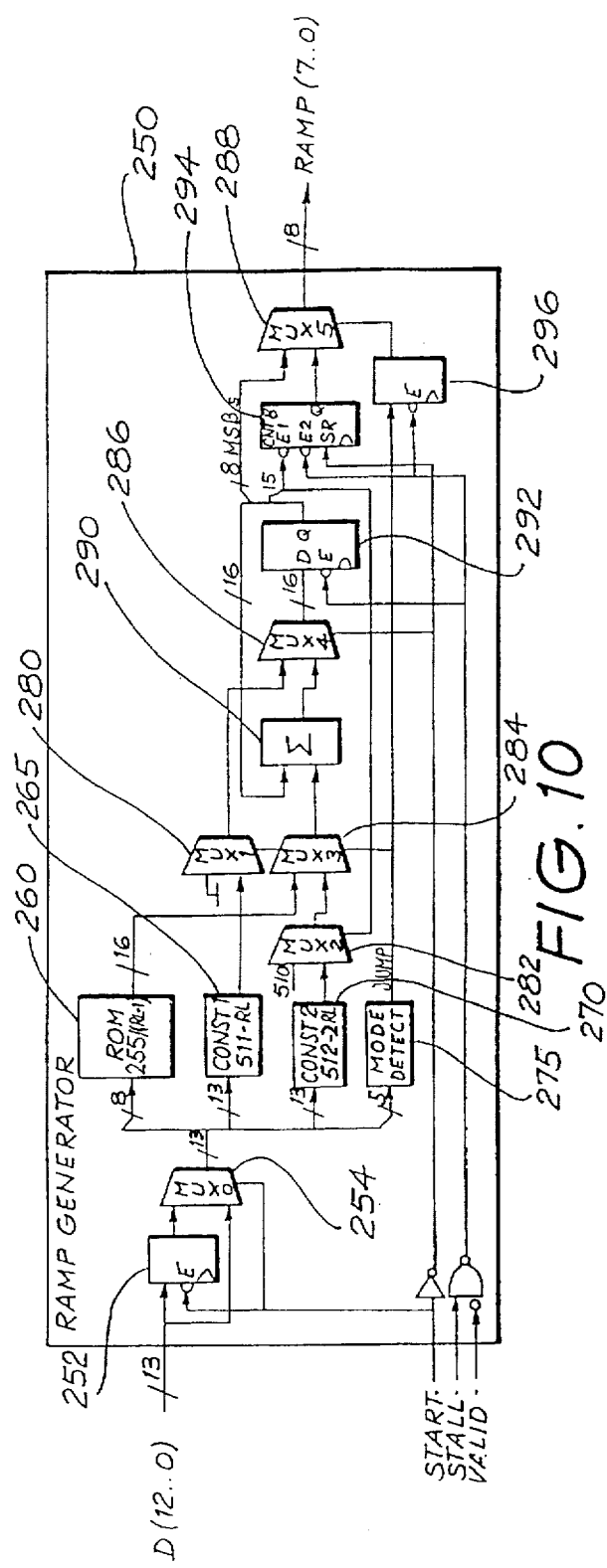
FIG. 10
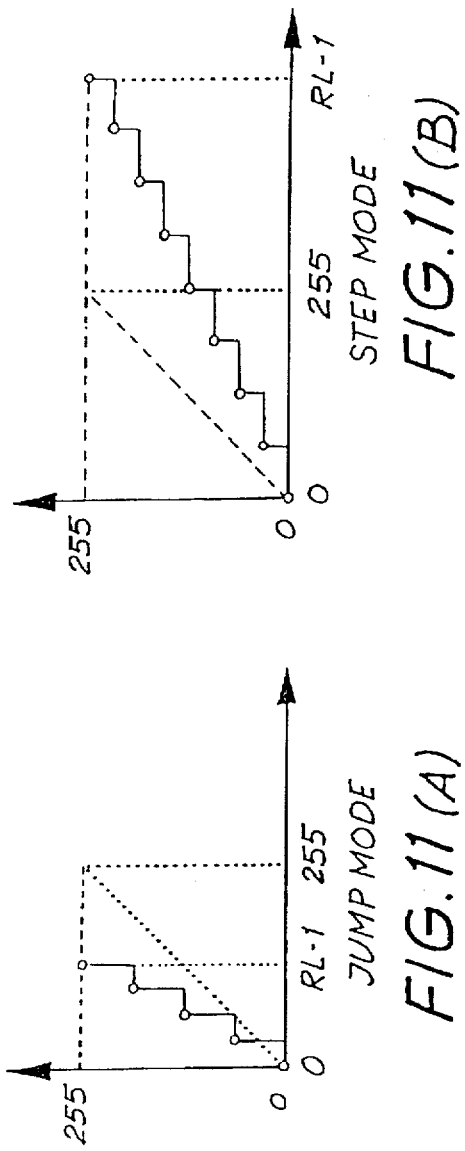
FIG. 11(A) JUMP MODE
FIG. 11(B) STEP MODE

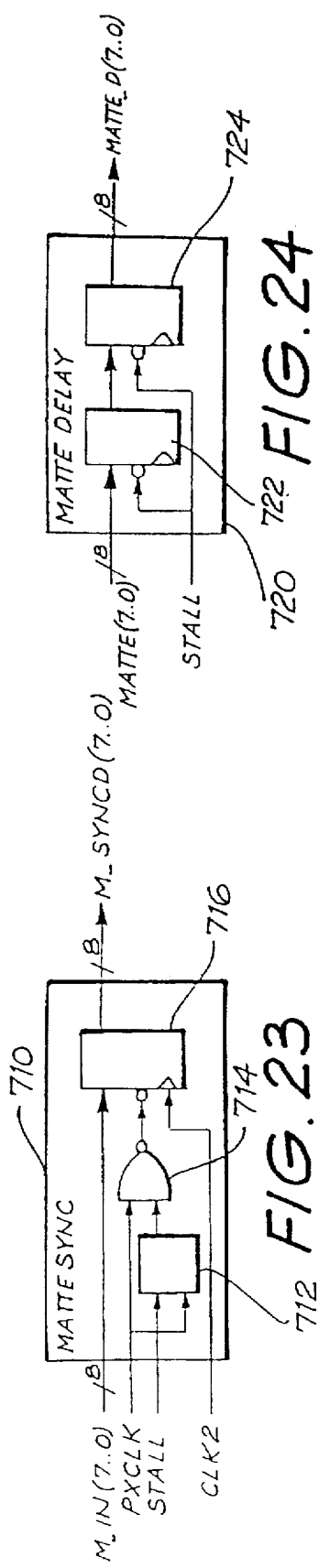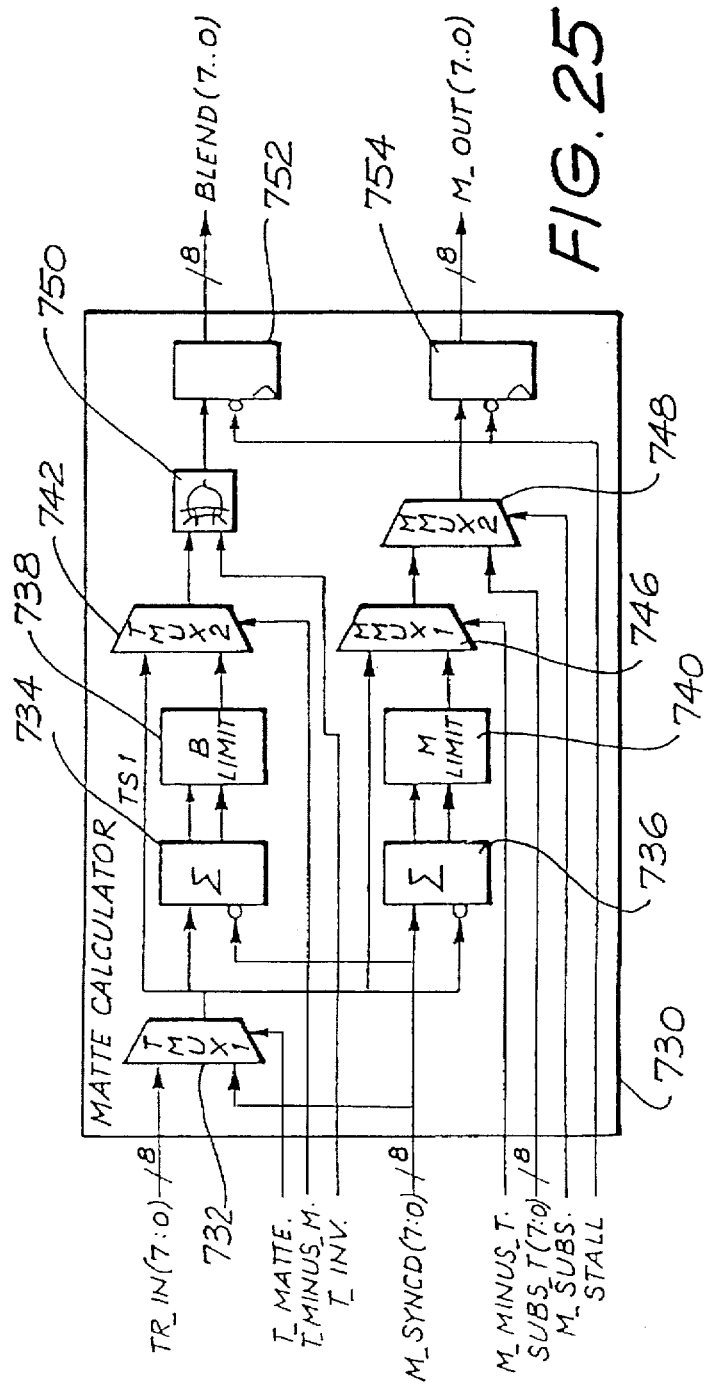
FIG. 24
FIG. 23
FIG. 25

RAMP GENERATING STRUCTURE FOR PRODUCING COLOR GRAPHICS

This application is a division of application Ser. No. 07/725,621 filed Jul. 3, 1991, now U.S. Pat. No. 5,459,823.

BACKGROUND OF THE INVENTION

1. Field of the invention

The present invention relates to computerised graphic systems, and in particular, discloses a graphics engine which provides for the manipulation of image data.

2. Prior Art

Desktop publishing systems are known in the art which enable a user to manipulate visual image data so as to create or amend a visual image in some manner.

Known systems generally have the capability of creating black and white images which can be outputted on either a monochrome display, or by use of a black and white laser printer.

However, there exists a demand for desktop publishing systems that operate in full colour and provide systems that operate in full colour and monochrome systems both as regards speed and function on the one hand and image quality on the other. However, for colour systems, the amount of data required to be processed is generally 24 times that of the black and white system. Accordingly, using existing technologies, processing times are correspondingly greater.

SUMMARY OF THE INVENTION

It is an object of the present invention to substantially overcome, or ameliorate the abovementioned difficulties through provision of a device that is capable of performing a variety of graphics functions on colour image data and to output the processed data at a data rate that is suitable for reproduction using existing visual displays and colour printers.

In accordance with one aspect of the present invention there is disclosed a graphics engine to manipulate colour video image data on a pixel-by-pixel basis, said engine comprising a parallel data path for each one of three primary colours of said image data, each said path comprising a cascade connected interpolator and compositor and said data paths being connected in parallel with a cascade connected transparency interpolator and matte combiner, wherein each of said colour interpolators receive colour variation commands, each of said compositors receive colour input data for each said pixel in turn and said compositors transform said colour input data in accordance with a predetermined function the output of which is dependent upon both the input colour data and the interpolator variation command, and wherein said transparency interpolator receives transparency variation commands, and said matte combiner receives matte plane input data for each said pixel and said combiner produces a colour blend value and an output matte value for each said pixel by transforming said input matte data in accordance with said transparency variation commands, the output of said graphics engine being colour image data simultaneously manipulated as colour, transparency and matte.

In accordance with another aspect of the present invention there is disclosed a ramp generator comprising:

means for storing a number (N) as a plurality of bits of information; an accumulator for generating a ramp output between a predetermined minimum and a predetermined maximum; and means for testing the most significant of said bits to establish either a step mode or a jump mode of operation, whereby in said step mode, said output increases at a rate less than 1:1 and in said jump mode, said output increases at a rate equal to or in excess of 1:1, the value of said number determining the real time taken for said output to traverse between said minimum and said maximum.

BRIEF DESCRIPTION OF THE DRAWINGS

A preferred embodiment of the present invention will now be described with reference to the drawings in which:

FIG. 10 is a schematic block diagram of the ramp generator of FIG. 7; FIGS. 11A and 11B illustrate the generation of the ramp of the generator of FIG. 10;

FIG. 23 is a schematic block diagram of the matte synchroniser of FIG. 22;

FIG. 24 is a schematic block diagram of the matte delay of FIG. 22; and

FIG. 25 is a schematic block diagram of the matte calculator of FIG. 22.

DESCRIPTION OF THE PREFERRED EMBODIMENTS

Figure 1A:
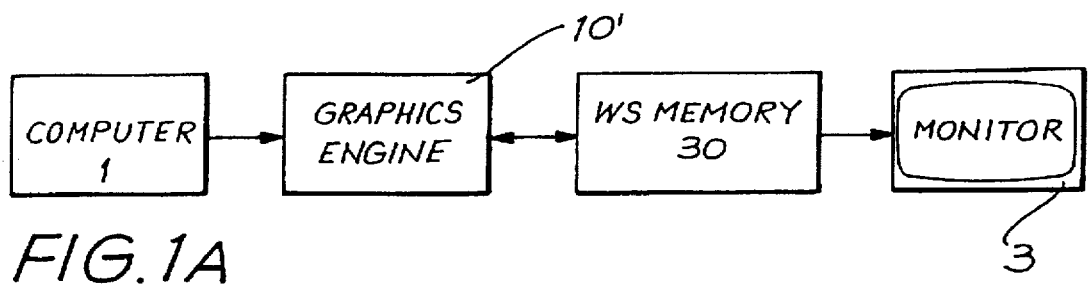
FIGS. 1A–1F are schematic block diagrams of prior art image manipulation systems which incorporate a graphics engine.
Figure 1B:
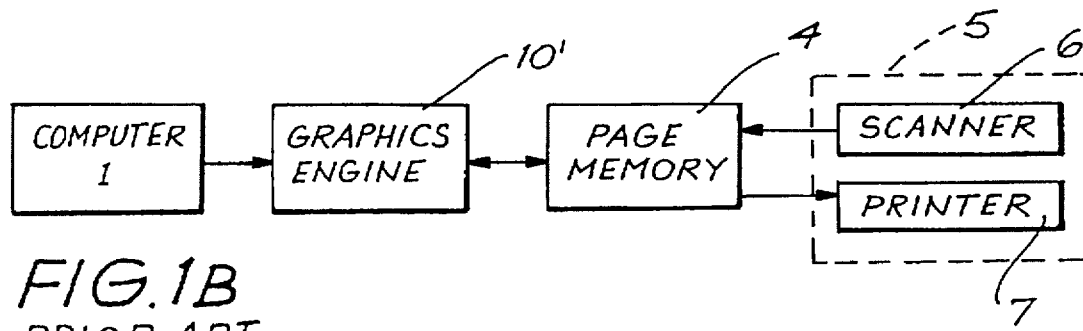

As seen in FIG. 1A, a simple form of image manipulation system takes the form of a general purpose computer 1, a graphics engine 10', a work screen memory 30 of typically 3 Mbytes maximum and a screen or monitor 3 capable of high resolution. In this system images stored in the computer 1 are able to be displayed on the monitor 3 and manipulated via the graphics engine 10 and the keyboard (not illustrated) associated with the monitor 3.

Another type of image manipulation system is associated with a colour laser copier 5 which is preferably the CANON CLC500 COLOR LASER COPIER (Registered Trade Mark). The copier 5 includes a scanner 6 and printer 7 which are connected to a page store or memory 4. The page memory 4 is typically 96 Mbytes maximum for an entire A3 size 400 dots per inch (dpi) image. The data rate of this copier is 13.35 MHz which is substantially the same as a standard video broadcast data rate of 13.5M pixels/second. The computer 1 and graphics engine 10' are substantially as before.

Figure 1C:
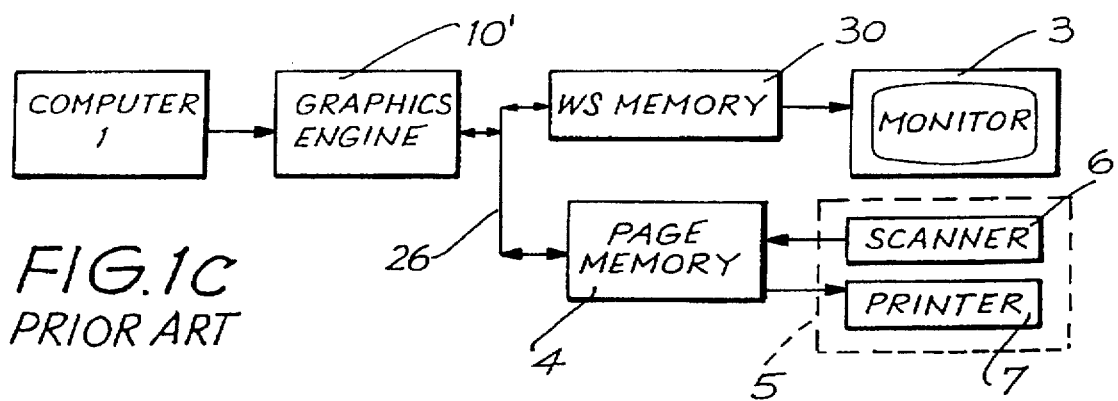

As indicated in FIG. 1C, it is possible to combine both the above systems by the provision of a data bus 26 interconnecting the graphics engine 10', the work screen memory 30 and page store 4. With this configuration, a image read by the scanner 6 can be manipulated whilst displayed on the monitor 3 and then printed out using the printer 7.

Figure 1D:
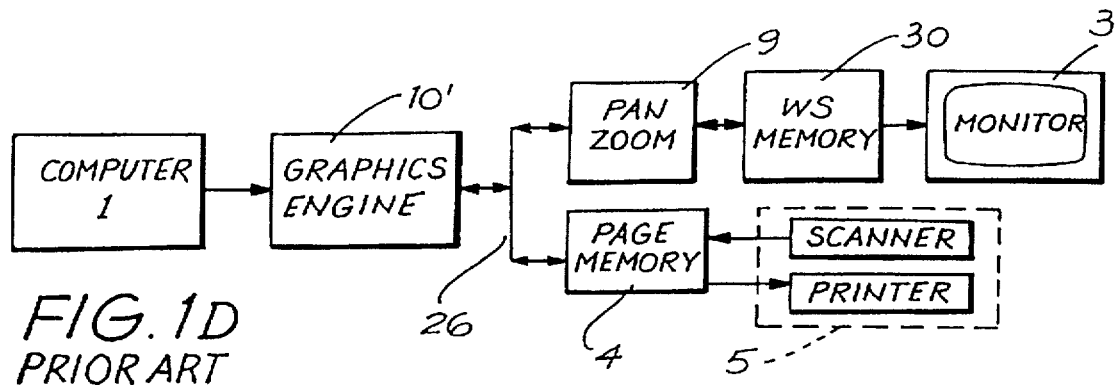

FIG. 1D illustrates a similar system save that a pan/zoom engine 9 is provided between the data bus 26 and the work screen store 30 to further increase the nature of the image data manipulations able to be performed.

Figure 1E:
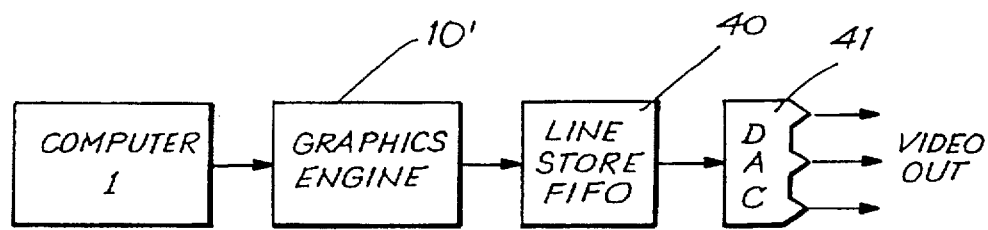

The system of FIG. 1E is concerned essentially with video images which can be either still video or lines of a live video for broadcast or other purposes. Here the graphics engine 10' provides an output (only) to a line store 40 which operates on the first in first out (FIFO) principle and which in turn outputs to a triple digital to analogue converter (DAC) 41 to provide the necessary output video signal.

Figure 1F:
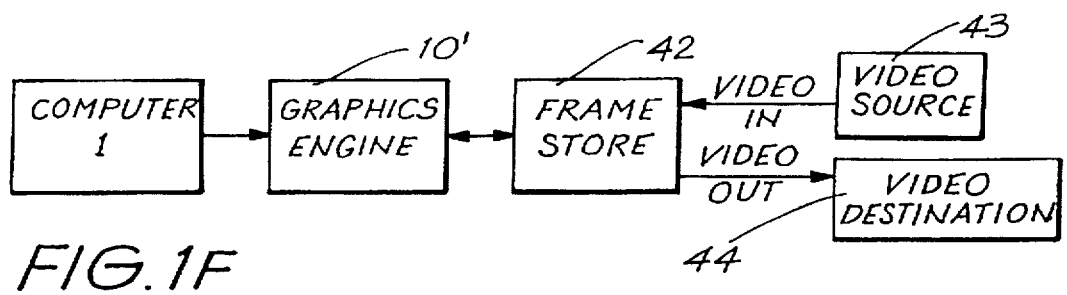

Lastly, as seen in FIG. 1F, a inter-active video image manipulation system incorporates the computer 1 and graphics engine 10' as before, however, the graphics engine 10 both outputs data to, and receives data from, a double buffered frame store 42. The frame store is able to receive video data from a video source 43 and output video data to a video destination 44.

With the above applications in mind, the preferred embodiment of the graphics engine 10 of the present invention will now be described with reference to FIG. 2 and with general reference to an image manipulation system of the general type depicted in FIG. 1D.

Figure 2:
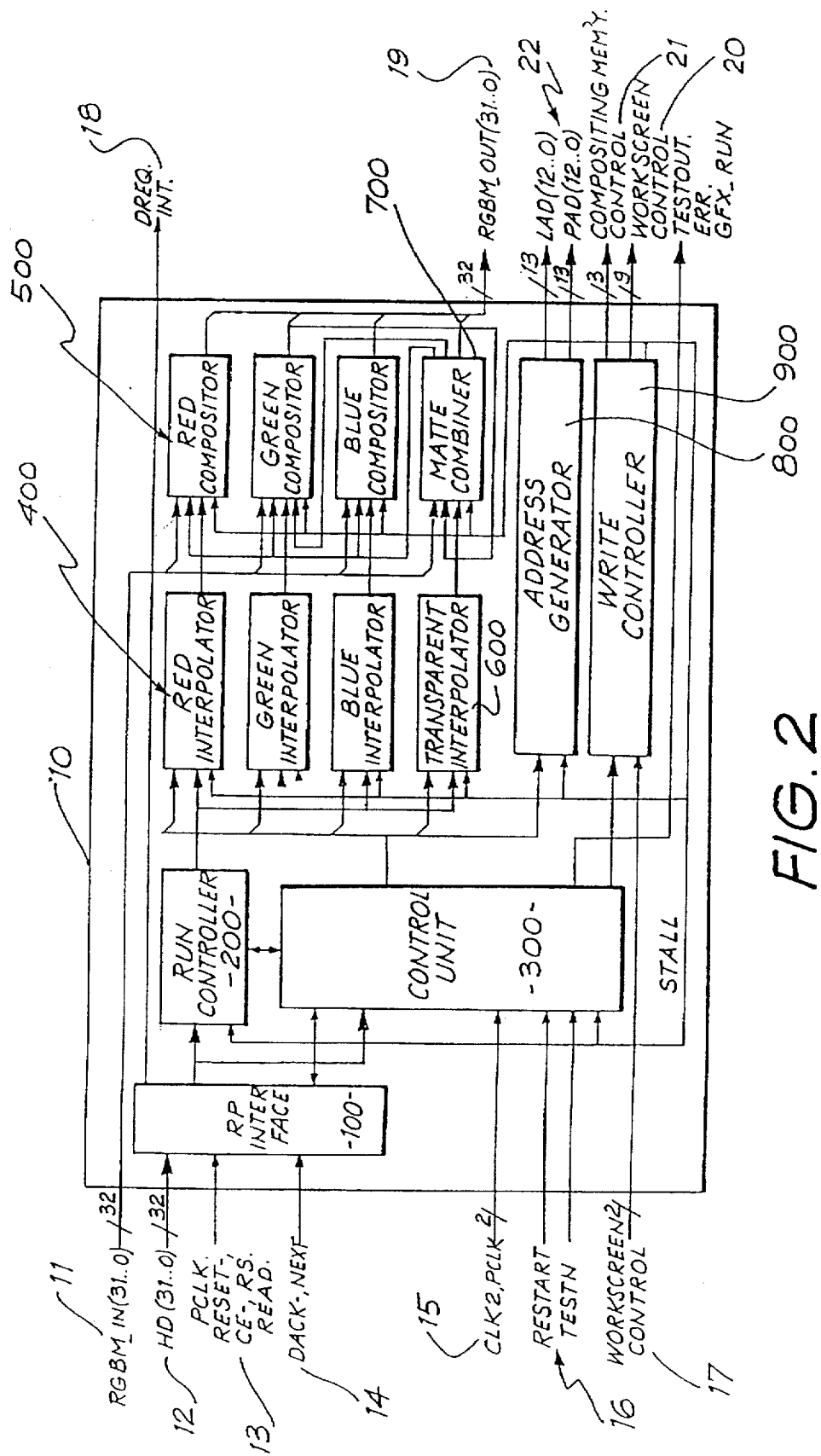
FIG. 2 is a schematic block diagram of the preferred embodiment of the graphics engine.

It will be seen in FIG. 2 that the graphics engine 10 includes an input data bus 11, which provides a video input, and an output video data bus 19. Also included within the graphics engine 10 is a render processor interface 100, a run length controller 200, and a control unit 300. A data path includes interpolators 400 for each of red, green, and blue, a transparency interpolator 600 as well as compositors 500 for each of red, green, and blue and a matte combiner 700. An address generator 800 and a write controller 900 are also provided.

Commands enter the graphics engine 10 via the RP interface 100 and both the bus 12 which provides RP data and the bus 13 which provides RP control. Signal lines 14 provide for direct memory access (DMA) control. The control unit 300 accepts two clock signals 15 which include a pixel clock running typically at 13.35 MHz. The control unit 300 reads data from the RP interface 100, interprets those commands received, and passes the command operands to the run controller 200, and to the data path including interpolators 400. The command operands are also passed to the address generator 800 and the write controller 900. The control unit 300 is also responsible for decoding microcode from these commands, which is subsequently used by respective execution devices within the engine 10.

The run controller 200 is initialised with the run length of the particular graphics command by the control unit 300 and produces a linearly increasing number in the form of a ramp from 0 to 255 for the duration of the run. This ramp is used by the interpolators 400 to control the mixing proportion in blend commands.

The graphics engine 10 is configured to operate upon red, green, blue and matte (RGBM) information which is an industry standard. The colour data path of red, green and blue interpolators 400, in the general case of a blend command, is initialised by the control unit 300 with a start colour and an end colour. The colour data path produces a blend between these two colours, and then composites the result, including a percentage of the current colour, in the pixel memory (work screen store 30 or page store 4) via the RGBM out bus 19. The transparency data path includes a transparency interpolator 600 and a matte combiner 700. In the simple case of a transparency blend command, the transparency data path is initialised by the control unit 300 with a start transparency and an end transparency. The transparency data path produces a blend between these two values, and the result is used to control the compositing proportions in the colour components. The transparency blend can also be written or composited with the matte plane in the pixel memory.

The address generator 800 provides the read and write addresses to pixel memory 4,30. The page memory 4 addresses are maintained independently from those of the work screen memory 30, allowing reads from the page memory 4, which is interconnected to the buses 11 and 19 via buffers, to occur in parallel with writes to the work screen memory 30, and visa versa.

The write controller 900 provides synchronised read and write signals to the pixel memory 4,30. In order to synchronise to the pan/zoom engine 9, the write controller 900 provides a STALL signal to suspend operation in all execution units of the engine 10 when waiting for completion of read or write access to the work screen memory 30. The write controller 900 also maintains a pipeline of status signals which contains the micro-code used by other execution units.

The data path as earlier described includes a colour portion divided into three component colours, red, green and blue. Each colour component is separated into two stages comprising an interpolator 400 and a compositor 500. The interpolators 400 are responsible for generating the blended colours, and the compositors 500 are responsible for mixing the blend with the pixel memory.

The transparency portion of the data path also has an interpolator 600, but not a compositor. When compositing to the matte plane, the green compositor 400 is used. The matte combiner 700 provides the colour compositors 500 with the mixing proportion which it selects from one of several possible transparency sources. The matte output is also fed to the red compositor 500 which allows the data which would have been written to the matte plane, to be written to the red plane instead.

Having introduced the structure of the graphics engine 10, the control of the various components thereof will now be described in further detail.

The control unit 300 preloads a set-up stage of a graphics command into the execution units even if the previous command is still being executed. When all the command parameters are loaded, and the previous command is complete, the graphics instruction is initiated with a "START" signal. The data path 400/500 and the address generator 800 proceed in parallel and emit the first pixel after a minimum of six clock periods on the pixel clock PXCLK 15. A new pixel is thereafter emitted every clock cycle for the duration of the instruction unless stalled by a peripheral device connected to the engine 10. Throughout the instruction, a ramp generator 150 (FIG. 10 to be described hereafter) within the run controller 200 supplies a linearly increasing number from 0 to 255 and indicates to the controller 300 when the instruction is completed via a "LAST" signal. The write controller 900 interfaces to the pixel memory 4,30, or the frame store 2, via the bus 21. The write controller 900 also interfaces to a further bus 20, supplying the pan/zoom engine 9 and workscreen memory 30, and keeps track of when and where to read and write pixels.

There are three types of commands executed by the graphics engine 10. These are: compositing commands, configuration commands, and synchronisation commands. Compositing commands are the most common type of instruction given to the engine 10 and they allow the computer 1 to perform full colour linear blending operations in the page store 4 and on the screen 3 via the work screen store 30. Configuration commands are used to set up internal or external hardware connections prior to executing compositing commands. Synchronisation commands are used to keep the graphics engine 10 synchronised to internal hardware events or external hardware events. Table 1 shows the three types of instructions and their respective instruction codes.

The source and destination of blending operations can be either the compositing page memory 4 (CM) or the workscreen 3 (WS). Accordingly, there are four types of compositing commands: compositing within the compositing memory 4; compositing within the workscreen memory 30; compositing from the compositing memory 4 to the workscreen memory 30; and compositing from the workscreen memory 30 to the compositing memory 4. During CM to CM compositing, one pixel is read and written in every pixel clock period (75 ns). Reads are performed in the first half of the pixel clock periods and writes in the second half. The graphics engine 10 uses a i pipeline delay system in which data is transferred sequentially between various devices within the engine 10. Accordingly, there is a delay between reading the "old" value of a pixel, and writing the "new" value of the pixel. For this reason, the compositing memory 4 address changes between the first and second halves of the pixel clock period.

Due to timing constraints in the compositing memory 4, there is one pixel clock period delay between issuing a read address, and reading the data at that address. This delay is compensated for by adjusting the position within the graphics engine 10 pipeline where the read data is received. The compositing memory 4 also has a one clock delay when writing pixel data, but this does not affect the internal operation of the graphics engine 10.

During WS to WS compositing, a maximum of one pixel is read or written in every pixel clock period (75 ns). Reads are requested in one pixel clock period, and writes in another. Because of pipeline delays in the graphics engine 10, for the same reasons as described above, the workscreen memory 30 address changes between successive read and write requests.

Due to timing constraints in the workscreen memory 30, there can be a delay between issuing a read request, and reading the data at that address. Handshake signals from the pan/zoom engine 9 indicate when the data is ready. This delay is compensated for by stalling the graphics engine 10 pipeline until the read data is received. The graphics engine 10 reads the data from the monitor or workscreen 3 in the clock period after the read acknowledge handshake signal is received from the pan/zoom engine 98e 8, in order to be compatible with the one clock delay in the compositing memory 4. Latches, (not illustrated and external to the graphics engine as earlier described), hold the data during this delay. The workscreen memory 30 can also have a delay when writing pixel data. Typically, the first pixel written will not be delayed, as the write request is "posted", and performed in subsequent clock periods. The pan/zoom ratio must be set to 1:1 for WS to WS compositing, as will be understood by those skilled in the art.

CM to WS compositing is used to transfer pixel data from the compositing memory 4 to the workscreen memory 30. During CM to WS compositing, a maximum of one pixel is read and written in every pixel clock period. Reads are requested from the compositing memory 4 in the first half of the pixel clock period. Writes are requested from the workscreen memory 30 during the entire pixel clock period, but the address and data are only available in the second half of the pixel clock period. Separate addresses are maintained for the workscreen address and the compositing memory 4 address.

Due to timing constraints in the compositing memory 3, there is a one pixel clock period delay between issuing a read address, and reading the data at that address. This delay is compensated for by adjusting the position within the graphics engine 10 pipeline where the read data is received. Due to timing constraints in the workscreen memory 30, there can be a delay between issuing the write request, and receiving the corresponding handshake signal from the pan/zoom engine 9 which indicates when the data has been accepted. This delay is compensated for by stalling the graphics engine pipeline until the handshake is received. The write address and data will be presented again in the second half of the next clock period until the handshake is received. Typically, the first pixel written will not be delayed, as the write request is posted, and performed in subsequent clock periods.

CM to WS compositing can be used in conjunction with a reduction zoom ratio to reduce the size of the workscreen image. In a reduction mode, the pan/zoom engine 9 discards pixels from the graphics engine 10, and only writes every "NTH" pixel. This is transparent to the operation of the graphics engine 10, as the only difference it perceives is that writes appear to be completed quicker.

CM to WS compositing can also be used in conjunction with a magnification zoom ratio to increase the size of the workscreen image. In expansion mode, the pan/zoom engine 9 reads a pixel from the graphics engine 10, and writes the next "N×N" pixels with the same value. This is also transparent to the operation of the graphics engine 10, as the only perceived difference is that writes appear to take longer to complete. Note that only the first pixel address in a run is used by the pan/zoom engine 9. The graphics engine 10 generates addresses for subsequent pixels, but those addresses are not required by the current implementation of the pan/zoom engine 9.

WS to CM compositing is used to transfer pixel data from the workscreen memory 30 to the compositing memory 4. During WS to CM compositing, a maximum of one pixel is read and written in every pixel clock period. Reads are requested from the workscreen memory 30 in the first half of the pixel clock period and writes are performed on the compositing memory 4 in the second half of the pixel clock period. If the workscreen read has not been acknowledged by the end of the pixel clock period, the pipeline will be stalled. The read request will remain pending, and the write to the compositing memory 4 will be repeated at the same address. Separate addresses are maintained for the workscreen memory 30 addresses and the compositing memory 4 addresses.

Due to timing constraints in the workscreen memory 30, there can be a delay between issuing a read request, and reading the data at that address. Again, handshake signals from the pan/zoom engine 9 indicate when the data is ready. This delay is compensated for by stalling the graphics engine pipline 10 until the read data is received. The compositing memory 4 has a one clock delay when writing the pixel data, but this does not affect the initial operation of the graphics engine 10.

WS to CM compositing can be used in conjunction with a reduction ratio to increase the size of the image as it is copied into the compositing memory 4. In this mode, the pan/zoom engine 9 initialises a workscreen address during the first pixel in a run, but only increments this address after every "N" pixel read requests from the graphics engine 10. This has the effect of expanding each pixel, but is transparent to the operation of the graphics engine 10. Note that only the first pixel address in a run is used by the pan/zoom engine 9. The graphics engine 10 generates addresses for subsequent pixels, but these addresses do not take the reduction ratio into account.

WS to CM compositing must not be used in conjunction with an expansion zoom ratio in the pan/zoom engine 9.

Configuration commands are used to set up internal and external hardware prior to executing compositing commands. The commands can be executed between compositing commands to allow long instruction streams to be formed.

A Load Zoom ratio command passes a parameter word following the instruction to the pan/zoom engine 9 via the workscreen address bus. The expansion factor appears on bits 3 to 0 of the parameter, and the reduction factor appears on bits 7 to 4. Timing for the transfer is the same as for a WS write command and no pixels are written. The "run length" field of the load zoom ratio command is set to one. Table 2 shows the load zoom ratio parameters.

A Load Graphics Engine (GE) Salt Configuration command allows various modes to be set within the graphics engine 10. Ideally, these modes are contained within each graphics instruction. A limited number of bits within the instruction word, however, prevents this possibility. Table 3 shows the load GE configuration parameter.

Bits 6 through 4 of the parameter following the load GE configuration instruction configure the "matte to red", "matte to green", and "matte to blue" modes respectively. Bits 3 to 0 of the parameter configure "write enables" to the R,G,B and M planes of the workscreen memory 30. These write enables provide a way to disable writes to individual planes in the workscreen memory 30. Compositing memory 4 writes are not affected by these bits. Image and matte write enables in graphics instructions can also disable writes, but not to individual planes. Bits 6 through 0 are used to allow data which is normally written to the matte plane, to be written to the red plane. Bits 10 through 7 allow screen compositing operations to be sped-up in certain circumstances. When "bit map" instructions are used, and the zoom ratio is 1:1, these three bits can be set. The SBR bit enables the "skip bit matte reads" mode. In this mode, screen reads are not requested from the workscreen if the appropriate bit in the bit map mask would have disabled the subsequent screen write. If the read is "skipped" the pixel will consume only one pixel clock period instead of the three or more required by the current implementation of the pan/zoom engine 9. Text typically contains a large percentage of "white space", so the potential time savings are substantial.

The SBW bit enables a "skip bit matte writes" mode. This mode disables screen write requests, when the appropriate bit in the bit map mask is 0, rather than simply disabling the screen plane write enables. In order to allow the skip bit matte read or write modes to function correctly with the current implementation of the pan/zoom engine 9, it is necessary to assert a line of the compositing memory 4 control bus 21 in every read or write cycle, to override the pan/zoom engine's automatic address calculations. The SER and SEW bits assert the start on every read, or the start on every write function. The "run length" field of the load salt configuration command should be set to one.

A Load Register command allows most of the internal registers of the graphics engine 10 to be loaded individually or collectively. The configuration of the load register instruction is shown in Table 4. This command is used in conjunction with the "execute microcode" instruction for testing purposes. Bits 27 through 0 of the instruction specify which internal register is to be loaded. The parameter following the instruction is then loaded into the specific register. More than one register can be loaded with the parameter. For example, registers 0 to 3, as defined in table 4, can be loaded at the same time because each register uses different bits from the parameter. Typically, the "alt microcode" register would also be loaded, before the "execute microcode" instruction is issued.

Run Length and Texture Offset registers (to be later described) cannot be loaded using the load register command. Separate registers called "alt run length" and "alt texture offset" registers, however, can be loaded. The graphics pipeline uses these registers instead of the usual registers when the "execute microcode" instruction is executed. Table 5 provides a description of various registers provided within the graphics engine 10.

Synchronisation commands are used to maintain graphics engine 10 synchronised to internal and external hardware events. There are two synchronisation commands, namely no operation (NOP) and WAIT.

The NOP instruction has no effect upon the graphics pipeline other than to consume one word and one clock cycle. It is intended to be used at the end of an instruction stream so that the length of the stream is a multiple of four 32-bit words. This ensures that the DMA controller, provided on bus 14 in FIG. 2, and which transfers data in four word bursts, will always send the last command.

The WAIT instruction prevents the graphics engine 10 from executing new instructions until one of three events occur. Those events are: a hardware restart signal is received, a software restart is received, or the graphics pipeline becomes empty. Options to the instructions select which of the events will restart instruction execution. Pixels from the previous instruction which are still in the graphics pipeline, are not effected by this instruction.

The hardware restart option allows the graphics engine 10 instruction execution to be synchronised to external "real-time" events. This is required when performing a "test scan" where the graphics engine 10 is used to copy an image from the compositing memory 4 to the workscreen 3, while the scanner is writing to the page memory 4 simultaneously. The graphics engine 10 and the scanner 6 operate on opposite halves of the page memory 4, and swap over every eight lines. The instruction stream presented to the graphics engine 10 is separated into multiple strips of eight lines. A single WAIT instruction is inserted between the compositing commands for each strip. This forces the graphics engine 10 to wait for the scanner to "catch-up" before proceeding to the next step.

A software restart option allows the computer 1 to be synchronised to the graphics engine 10 instruction execution. If the computer 1 needs to perform certain tasks between groups of graphics instructions, a WAIT instruction can be inserted between the groups. When the graphics engine 10 reaches the WAIT, an interrupt is optionally generated, and the execution of the new instructions is suspended until the computer 1 writes to a CONTROL register with the RESTART bit set, as will be discussed later.

The pipeline empty restart option allows the graphics engine 10 to wait until the previous instruction is fully completed before starting a new instruction. This instruction is generally not required in normal operation. It is only required if a design error allowed neighbouring i instructions to effect each other. Table 6 shows the bit relationship of the WAIT instruction.

In addition to registers provided for the DMA bus 14 in FIG. 2, registers are also available for the computer 1 to interface with the graphics engine 10. Table 7 lists internal registers of the graphics engine 10 showing the relative address, size and whether the respective address is readable or writable. The COMMAND register provides an alternate mechanism for writing graphics commands to the graphics engine 10. Writing to the COMMAND register places the input data on the top of a FIFO 150 within the RP interface 100, and is effectively the same as writing via the DMA bus 14. The status of the FIFO 150 should be read from the STATUS register before writing to the COMMAND register, to ensure that the FIFO 150 is not full. Writing graphics commands via the COMMAND register is relatively slow, as it is not expected to be used in normal operation. It does, however, provide a means of "single stepping" the graphics engine 10 for debugging and self test purposes. The FIFO 150 can also be written one word at a time. The control unit 300, however does not read the FIFO 150 until it contains at least four words. Table 8 shows the arrangement of the command register.

The CONTROL register is used for setting interrupt masks, clearing interrupts, and enabling various test modes, and includes a bit configuration as shown in Table 9.

The HIE bit is the hardware interrupt enable. If set to a 1, the computer 1 will receive an interrupt when the graphics engine 10 receives a WAIT command when the "hardware restart" option is enabled. This interrupt is cleared by writing a 1 to the CHI bit (even if the graphics engine 10 is stopped). The setting of the HIE bit can be read from the STATUS register.

The EIE bit is the "ERROR" interrupt enable. If set to a 1, the computer 1 will receive an interrupt when the graphics engine 10 detects an error condition. This interrupt is cleared by writing a 1 to the CEI bit, until a new error is detected. An error is detected if a hardware restart or a software restart is received when the graphics engine 10 is not in the STOPPED state. In the case of a hardware restart, this indicates a loss of synchronisation with the external real time event. The current setting of the EIE bit can be read from the STATUS register.

The RST bit is used to restart the graphics pipeline. When this bit changes from a 0 to a 1, the graphics pipeline is restarted.

The SWR bit is used to generate a software reset. When set to a 1, the entire graphics engine 10 is reset to the power on reset condition. The SWR bit does not need to be cleared by a programmer, as the CONTROL register is also reset.

The SEE bit is the "stop on error" enable. If set to a 1, the graphics engine 10 will enter the STOPPED condition if an error is detected.

Six bits designated TMn are used to enable test modes in blocks within the graphics engine 10. TM0 is used to put the run length counter 220 into a test mode as will be discussed later. TM1 is used to put page and screen address counters, within the address generator 800 into a test mode, as will also be discussed later.

The STATUS register is used to monitor the interrupt flags and the FIFO 150 status, to read the version number, and to read the status of the various test modules. Table 9 shows the configuration of the status register.

The HIE, SIE and EIE bits reflect the state of the interrupt masks set in the CONTROL register. The HIF, SIF, and EIF bits are interrupt flags. If these flags are set, and their corresponding interrupt enable bit is set, an interrupt will be generated.

The HIF bit is set when the graphics engine 10 receives a WAIT command with the "hardware restart" option enable. This bit is cleared by writing a 1 to the CHI bit in the CONTROL register.

The SIF bit is set when the graphics engine 10 receives a WAIT command with the "software restart" option enable. This bit is cleared by writing a 1 to the CSI bit in the CONTROL register.

The EIE bit is set when an error condition is detected. This interrupt is cleared by writing a 1 to the CEI bit in the CONTROL register.

The FFF bit is set when the FIFO 150 is full, indicating that the COMMAND register should not be written.

The GR bit is set when the graphics engine 10 is running. Running is defined as "not waiting and the FIFO 150 is not empty". (i.e. when the graphics engine 10 is executing an instruction).

The DOE bit is set when a DMA controller, with the RP controller 120, detects an overrun condition in the FIFO 150. The TSn bits reflect the level of a number of internal modes which are used during testing by the device manufacturer during manufacture of the graphics engine 10 using LSI technology. The Vn bits contain the version number of the integrated circuit (LSI) chip.

The graphics engine 10 inputs and outputs can be classified into four categories:

1. Interface signals with the computer 1, and in the preferred embodiment, the computer is an i960 processor operating at 33 MHz;
2. Page memory 4 interface signals;
3. pan/zoom interface signals; and 4. other interconnect signals.

Table 10 provides a list of each of these signals.

The computer 1 (i960) can access the graphics engine 10 in three ways, either by DMA writes, register reads, and register writes. The DMA interface 14 is used to transfer graphics commands from the memory of the computer 1 at high speed. Register writes are used to configure the graphics engine 10, and register reads are used to monitor the status of the graphics engine 10. Register reads and writes are also used in test and debug modes.

High speed DMA accesses are required in order to transfer large images to the graphics engine 10 without degrading the operation of the graphics system, seen in FIG. 1. The graphics engine 10 has an internal FIFO 150 which accepts four consecutive 32-bit words from the DMA controller of the computer 1 in a single DMA transfer. This type of transfer is known as a "quad word burst flyby" DMA transfer. A DMA request is issued by the graphics engine 10 whenever the FIFO 150 has room for at least four 32-bit words. The DMA controller of the computer 1 subsequently acknowledges the request and writes four 32-bit words of data in a single burst transfer. The time to complete the transfer is determined by the access time of the memory (usually dynamic RAM) of the computer 1. The time between accesses is determined by the available bandwidth of the bus interconnecting the computer 1 and graphics engine 10). If no other DMA channels are operating, the graphics engine 10 is guaranteed at least 50% access to this bus. Assuming most accesses to the computer 1 are burst accesses, the peak transfer rate to the graphics engine 10 is approximately 432-bit words every 26 processor clock cycles. This is equal to five million full colour pixels per second, or 20 megabytes per second at 33 MHz when using the i960 processor.

Registers are written by the computer 1 using the 32 bit data bus 12, one address line, a read/write signal, and a chip select as indicated by the bus 13 in FIG. 2.

The interface between the graphics engine 10 and the compositing page memory 4 preferably has a bandwidth of approximately 100 megabytes per second. One 32-bit pixel is read and written in every pixel clock period (75 ns). Reads are performed in the first half of the pixel clock periods, and writes in the second half. The data bus 19 changes direction twice in every pixel clock period. Since the width of the data bus 19 is high (32 bits) care must be taken to ensure that there is no contention between the graphics engine 10 and the compositing memory q when the bus 19 is changed from input to output, and output to input.

The compositing memory 4 uses static RAM chips with an access time of 25 ns. In order to relax timing constraints on the graphics engine 10, a one clock delay is inserted between issuing a read address, and reading the data at that address. This delay is compensated for by adjusting the position within the graphics pipeline of the engine 10 at which the data is accepted.

Furthermore, in order to relax timing constraints on the graphics engine 10, a one clock delay is inserted between issuing a write, and when the write is actually performed. This delay is transparent to the operation of the graphics engine 10.

The interface between the graphics engine 10 and the workscreen 3 uses the same address and data bus as used to read and write to the compositing memory 4. The workscreen memory 30 is shared between an S Bus device, display refresh, and reads and writes from the graphics engine 10 via the pan/zoom engine 9. As a result, there is a delay between issuing a read request, and reading the data at that address. Handshake signals from the pan/zoom engine 9 indicate when the data is ready. This delay is accounted for by stalling the pipeline of the graphics engine 10 until the read data is received. The workscreen memory 30 can also have a delay when writing pixel data. Typically, the first pixel written will not be delayed, as the write request is posted, and performed in subsequent clock periods.

The preferred hardware implementation of the graphics engine 10 can now be described having introduced various control functions that the graphics engine 10 provides. Not all hardware components are described in detail as some perform functions that are readily identifiable from their name and hence are readily understood by those skilled in the art.

Unless otherwise stated, all latches and flipflops to be referred to use the main pixel clock signal PXCLK (operating at 13.35 megahertz). Enable signals do not clock these devices directly, or gate the clock, but simply select new data via a front end multiplexer which would otherwise recirculate old data. The various modules of FIG. 2 can now be described.

Figure 3:
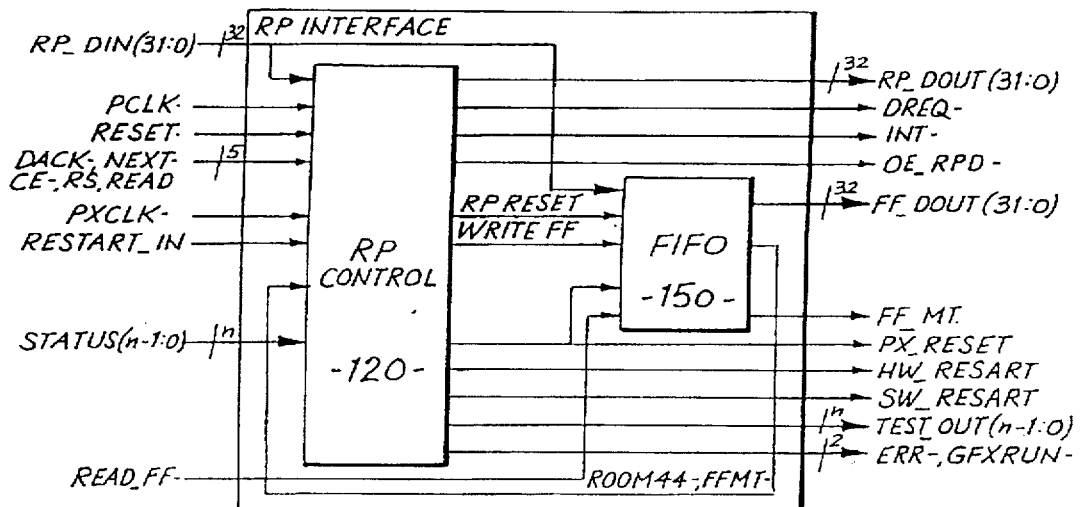
FIG. 3 is a schematic block diagram of the render processor interface of FIG. 2.

The render processor interface 100 of FIG. 3 is responsible for controlling and monitoring the status of the graphics pipeline of the engine 10 from the computer 1 which is preferably an i960 processor. All control signals between the graphics engine 10 and the computer 1 are synchronous to the computer clock HCLK. The RP interface 100 resynchronises the signals to the pixel clock (PXCLK) which is used by the remainder of the graphics engine 10. The RP interface 100 is divided into a control block 120 and a first-in-first-out shift register (FIFO) 150.

The RP controller 120 is not shown in detail but generally includes an address decoder, a control register, a status register, an interrupt controller and a DMA controller. The address decoder generates register select signals for the control register, the status register and the command register. The control register, when selected by the address decoder is loaded with data from the computer 1 which is used to configure the interrupt, synchronisation, and test modes as earlier defined. The control register contains resynchronisation flip-flops to synchronise to the pixel clock PXCLK. The status register allows the computer 1 to monitor interrupt flags, the status of the FIFO 150, and other internal conditions as defined earlier. The status register also contains circuitry to regenerate synchronised reset signals and status outputs. The interrupt controller combines interrupt flags from the status register where the interrupt enables from the control register to produce the output INT of i the interface 100. The DMA controller generates a DMA request when ROOM_44, seen in FIG. 3, indicates that the FIFO 150 has room for four more words from the computer 1. When the computer 1 grants a DMA cycle via the DACK signal, a new word is written into the FIFO 150 in each processor clock period where NEXT is asserted. If a DMA acknowledge is received when a DMA cycle has not been requested, an error condition is generated. A WRITEFF signal is asserted for each valid DMA word.

Figure 4:
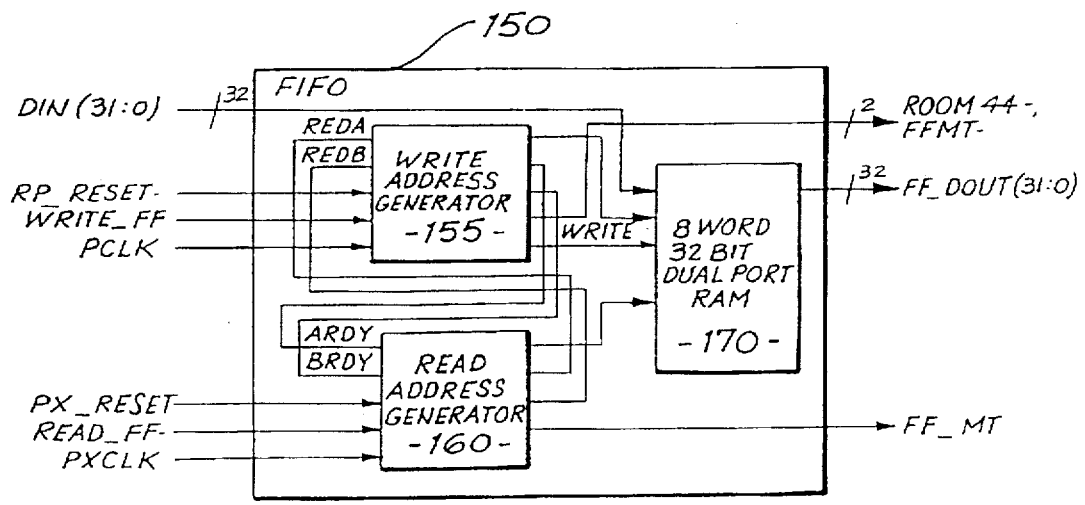
FIG. 4 is a schematic block diagram of the first-in-first-out register of FIG. 3.

The FIFO 150 as seen in FIG. 4 uses an eight word 32 bit dual port RAM 170 to interface the computer 1 with the pixel pipeline within the engine 10. A write address generator 155, synchronised to the processor clock PLCK interfaces the computer 1 to the RAM 170. A read address generator 160, synchronised to the pixel clock PXCLK interfaces the RAM 170 to the pixel pipeline. Handshake signals between the two address generators are synchronised in each of their respective receiving circuits.

The write address generator 155 operates synchronously with the i processor clock PCLK to produce an address and a write pulse to the RAM 170. The generator 155 a! so generates a signal to indicate when there is room for four more words, and two signals to indicate when the two halves of the FIFO 150 contain valid data. The FFMT output provides an indication to the computer 1 via the status register of the RP Controller 120 that the COMMAND register should not be written.

The generator 155 is implemented with a three-bit counter which is reset to 0 when the RP_RESET signal is asserted. The counter increments when the WRITE_FF signal is asserted.

The read address generator 160 operates synchronously with the pixel clock PXCLK to produce an address to the RAM 170. The generator 160 provides a signal to indicate when the FIFO 150 is empty and two signals to indicate when the two halves of the FIFO 150 have been read. The generator 160 is implemented with a four-bit state machine which is initialized when the PX_RESET signal is asserted.

Figure 5:
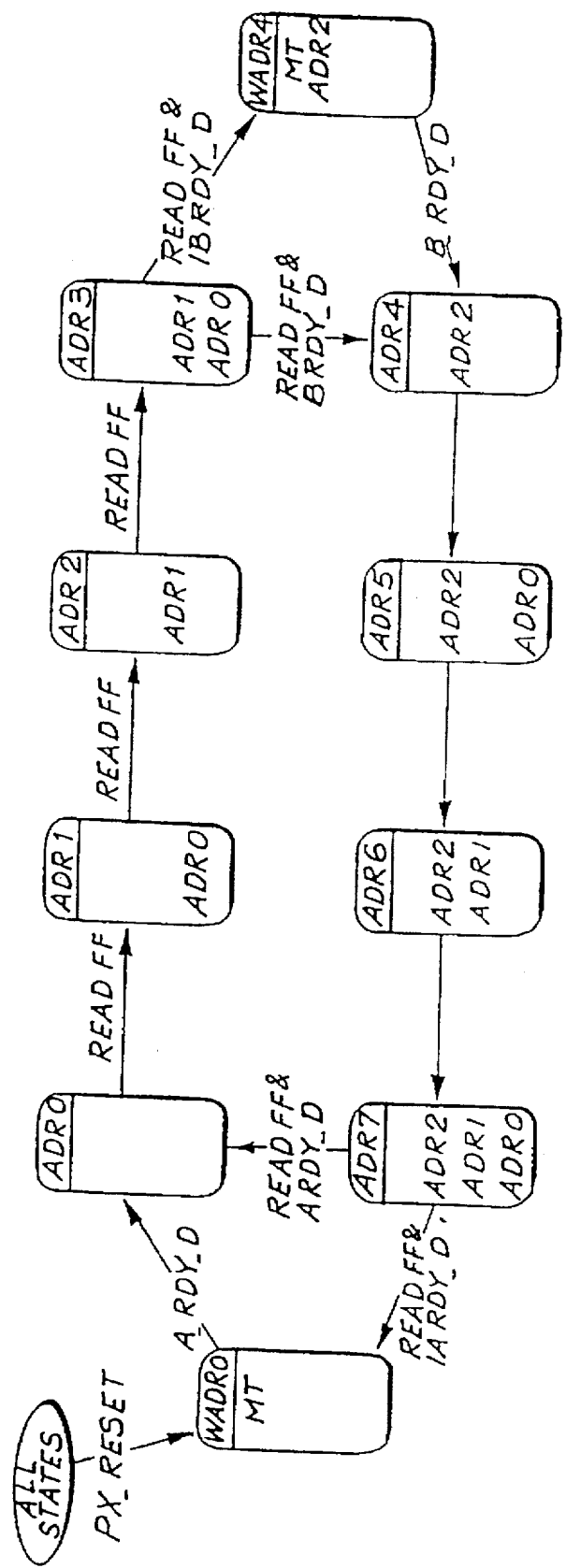
FIG. 5 is a flow chart showing various states of the read address generator of FIG. 4.

FIG. 5 shows a state transition diagram which illustrates how the address and the "empty" signal (MT) are generated within the read address generator 160.

Figure 6:
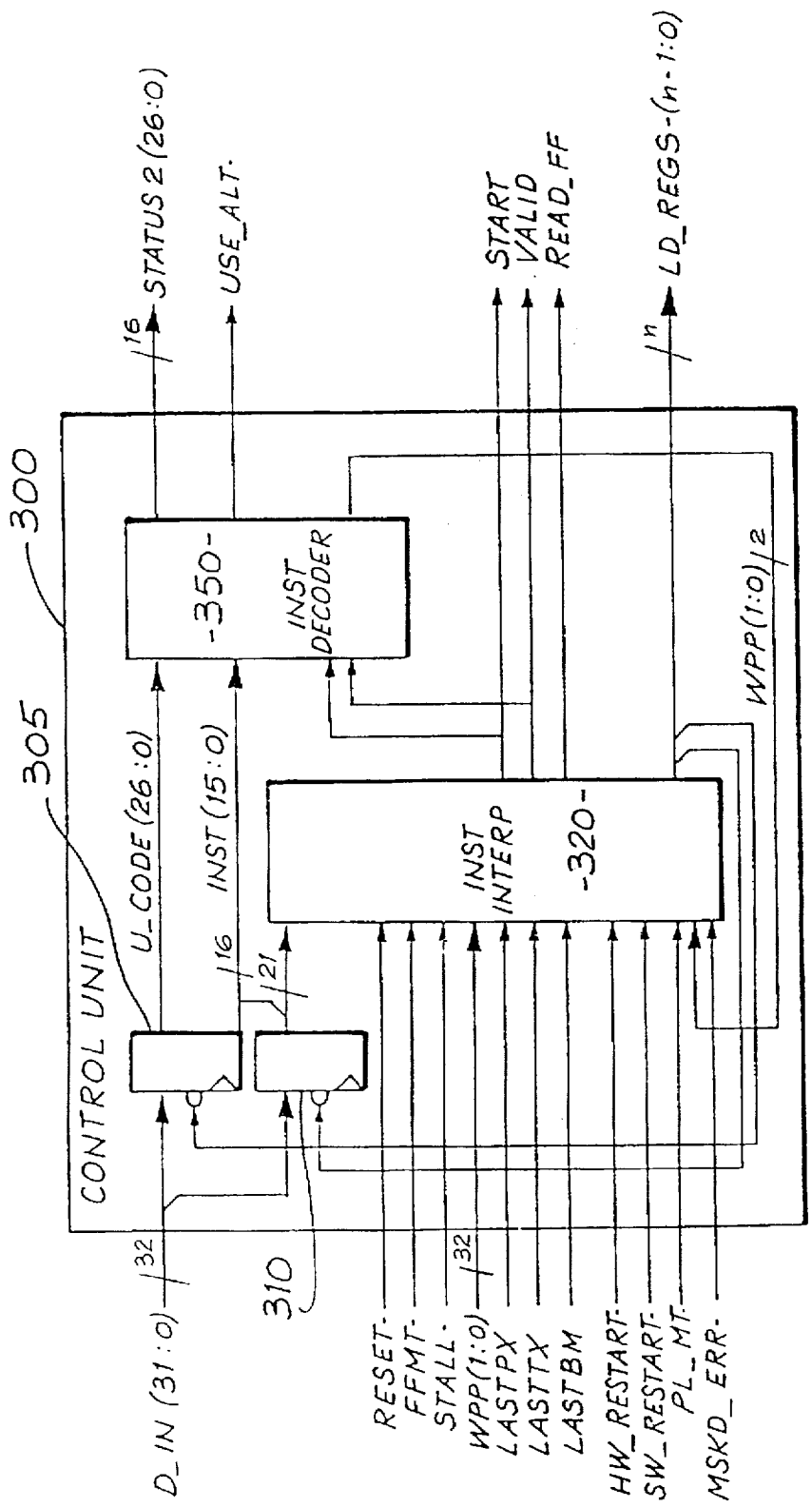
FIG. 6 is a schematic block diagram of the control unit of FIG. 2.

The control unit 300, seen in FIG. 6, interfaces the render processer FIFO 150 to the graphics pipeline. The unit 300 consists of instruction and microcode registers 305 and 310, an instruction interpreter 320, and an instruction decoder 350. The instruction interpreter 320 parses incoming instructions and parameters, loading the registers 305 and 310 in accordance with the command received. The instruction decoder 350 uses the instruction register 310 to produce a status word which is passed to the graphics pipeline. If an "EX_UCODE" instruction is detected, the normal instruction decode is bypassed by the data in the microcode register 305. This code is used for test and debug purposes.

The construction and operation of the instruction interpreter 320 and instruction decoder 350 will be apparent to those skilled in the development of applications specific microcontrollers and processors. In the development of each new microcontroller, a new or modified instruction set must be developed which when reading data, must involve the interpretation and decoding of various commands.

Figure 7:
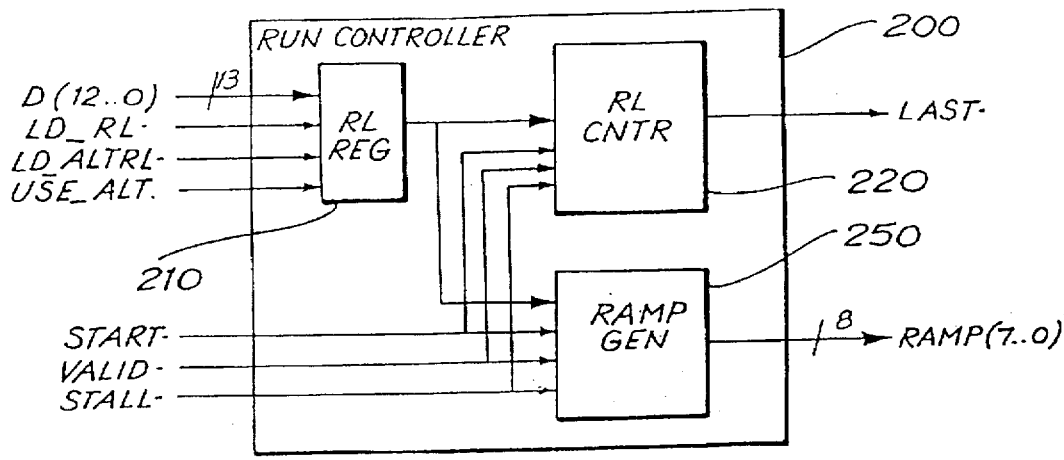
FIG. 7 is a schematic block diagram of the run controller of FIG. 2.

The run controller 200, seen in FIG. 7, interconnects the RP interface 100 with the data path including interpolators 400 and compostors 500. The run controller 200 performs two tasks through the generation of an interpolation ramp, and to indicate when the last pixel in a run is being composited. To perform these functions, it is required that the run controller 200 be loaded with the run length, a start pulse, a valid indicator, and a stall indicator. The run length is loaded from the FIFO 150 database when instructed by the instruction interpreter 320 of the control unit 300. The start and valid signals also come from the instruction interpreter 320 whilst the stall signal comes from the write controller 900. As seen in FIG. 7, the run controller 200 includes a run length register 210, a run length counter 220, and a ramp generator 250.

Figure 8:
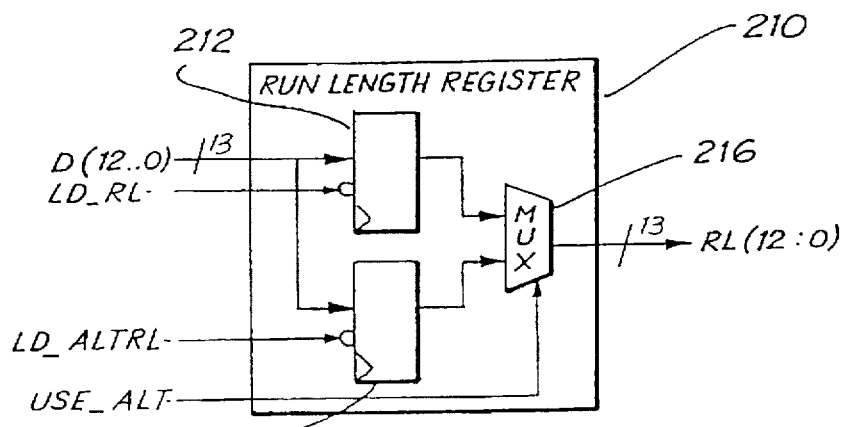
FIG. 8. is a schematic block diagram of the run length register of FIG. 7.

The run length register 210, shown in more detail in FIG. 8, includes latches 212 and 214 and a multiplexer 216. The latch 212 contains the run length of the next graphics command. The current graphics command can still be running when the latch 212 is loaded. The latch 214 contains an alternate run length which is used when an USE_ALT signal is asserted.

Figure 9:
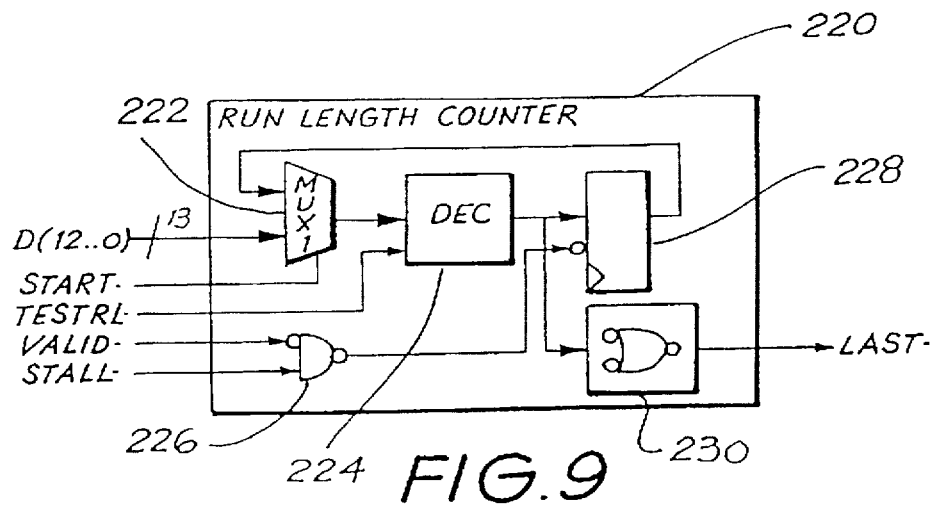
FIG. 9 is a schematic block diagram of the run length counter of Fig.
Figure 12:
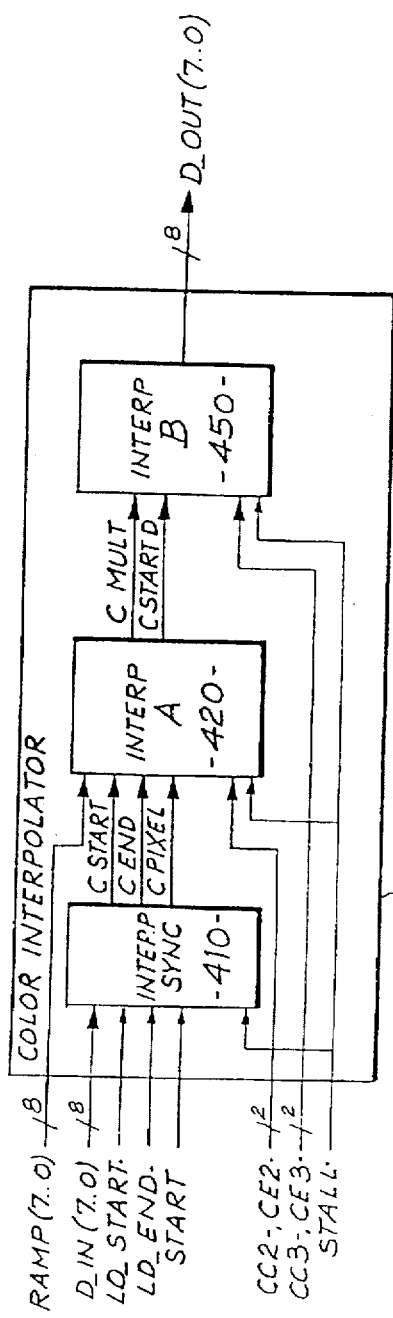
FIG. 12 is a schematic block diagram of one of the colour interpolators of FIG. 2.

The run length counter 220, seen in detail in FIG. 9, includes a multiplexer 222, a decrementing counter 224, a gate 226, a latch 228 and a logic unit 230. The run length counter 220 counts the number of pixel composited and indicates when the last pixel is in progress. The counter 220 is initialized with one less than the value in the run length register 210 when the START signal is asserted. The counter 220 decrements in all cycles, including the start cycle, unless STALL is asserted or VALID is negated, in which case the counter retains the current value. When the counter reaches 0, the LAST signal is asserted. The minimum value for the run length is 1. In this case, the LAST signal is asserted in the same state as the START signal asserted.

The ramp (or staircase) generator 250, seen in FIG. 10 generates a linearly increasing number from 0 to 255 over the real time duration of the graphics instruction being executed. The generator 250 is initialized with the value in the run length register 210 when the START signal is asserted. The generator 250 is updated in all cycles unless the STALL signal is asserted.

The ramp generator 250 comprises an input latch 252 which supplies a multiplexer switch 254 selected by the START signal, a ROM 255, a mode detector 275, and generating structures 265, 270, 282, 280, 284, 290, 286, 292, 294, 296, and 288 which generate the ramp signal. The multiplexer 254 outputs the 13 bit data word, representing the run length, to four individual units which operate on selective bits of the word. The eight least significant bits are supplied to a ROM 260 which comprises a lookup table outputting a value corresponding to 255/(RL−1). All 13 bits of the word are supplied to a subtractor CONST1 265 which calculates the value (511−RL). Similarly, all 13 bits also supply a further substractor CONST2 270 which calculates (512−2RL). The five most significant bits supply a mode detector circuit 275 which represents a five input OR gate which provides a jump signal. The outputs of ROM 260, CONST1 265 and CONST2 270 connect to three multiplexer switches 284, 280 and 282 respectively. The multiplexers 280 and 284 are switched when the jump output of the mode detector circuit 275 is asserted. The multiplexer 282 is switched when the most significant bit output from the a 16-bit D-flipflop 292 is asserted. The generator 250 also includes a summer 290, further multiplexers 286 and 288, a flipflop 294 and a latch 296. It is apparent from FIG. 10 that the output of the flipflop 292 divides such that all 16 bits are fed back to the summer 290, thus forming an accumulator, with the eight most significant bits of which being output to the multiplexer 288. As indicated earlier, the most significant bit, bit 15, feeds back to switch the multiplexer 282 as well as supplying an input to the flipflop 294 configured to operate as a counter.

FIGS. 11A and B show the two ways in which the ramp output of the generator 250 is formed. Note that an update of the generator 250 does not necessarily imply that the ramp output value is changed (as in the case when the run length is greater than 255). The generator 250 operates in two modes. Firstly a "jump" mode when the run length is less than or equal to 255, and a "step" mode when the run length is greater than 255. The mode is determined by an examination of the five most significant bits of the run length. In the jump mode, the ramp value will increase by at least one in every clock period. In the step mode, the ramp value increases by a maximum of one in each clock period.

When in the jump mode, the output value from the ROM 260 is added to the (flip-flop) 292 which is initialized to zero by the START signal. The most significant bits of the accumulator form the ramp output as can be seen from FIG. 10.

When in the step mode, the generator 250 applies an algorithm similar to Bresenham's line drawing algorithm, which is known to those in the computer graphic arts. The (flip-flop) 292 is initialized with the constant (511−RL), and the flip-flop (ramp counter) 294 is initialized to zero. In subsequent clocks, one of two constants are added to the accumulator:–510 if the accumulator is negative, or, (512–2RL) if the accumulator is positive. The ramp counter (flip flop 294) is incremented on every clock where the (flip-flop 292) is positive. Note that the step mode requires the multiplexer 254 to bypass the latch 252 during the START cycle. This allows the new value in the CONST1 module 265 to be loaded into the (flip-flop) 292 in the START cycle. The multiplexers 280 and 282 are shown in FIG. 10 for clarity only. A simpler implementation for the multiplexer 280 is a string of AND gates. Similarly, the multiplexer 282 can be implemented as a string of OR gate for the nine least significant bits, and a string of AND gates for the most significant bits.

The colour component data path of the graphic engine 10 consists of three eight-bit data paths. Each eight-bit path contains interpolator 400, which also performs colour correction, and a compositor 500. The red, green and blue interpolators are identical. The three compositors, however, are slightly different. The green compositor is used by the matte channel in some instructions and the resulting differences in the green channel are described later in this specification. The colour interpolators 400 comprise three modules: a synchronisation module 410, an interpolation phase A 420, and an interpolation phase B 450. The synchronisation module 410 spans stages 0 and 1 of the graphics pipeline and holds operands for the current instruction, and instruction operands for the next instruction. The interpolation phases A and B (420 and 450) perform blends and colour correction. The two phases are required in order to maintain one pixel per clock cycle. Phase A (420) is in stage 2 of the pipeline, and phase B (450) is in stage 3.

The synchronisation module 410 is not shown in detail but however comprises latches and flipflops which provide the start colour, the end colour and the pixel value.

Figure 13:
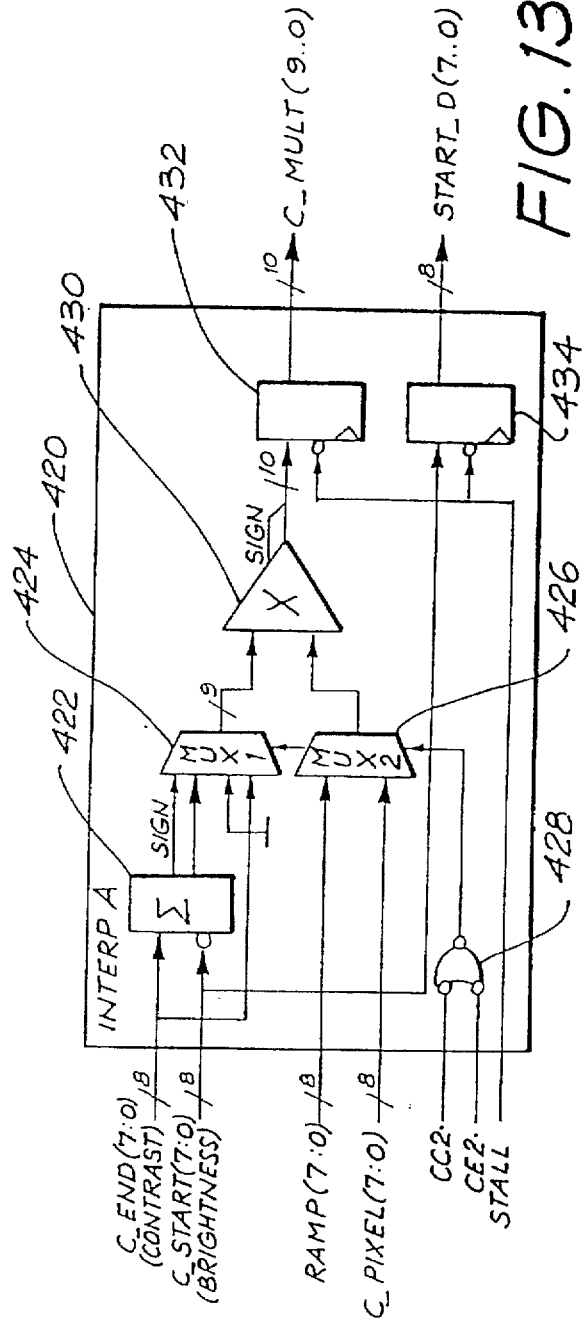
FIG. 13 is a schematic block diagram of the interpolator A of FIG. 12.
Figure 14:
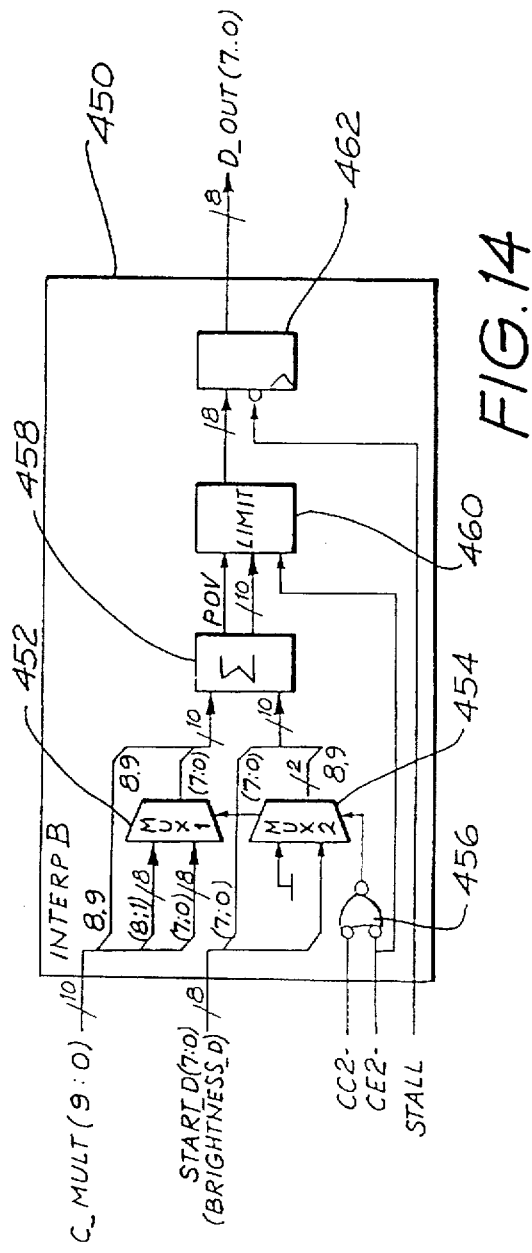
FIG. 14 is a schematic block diagram of the interpolator B of FIG. 12.

The interpolation phase A 420 is shown in FIG. 13 and performs two types of calculations, either blends, or colour corrections. Those skilled in the art will appreciate that colour runs are simply a degenerate case of a blend when the start and end colours are the same. The phase A interpolator 420 performs calculations for the first part of both types, namely for blends, C_MULT=(END–START)*RAMP/256 for colour correction, C_MULT=(END*PIXEL/256).

The interpolator phase A 420 comprises a summer 4Z2 which subtracts the START value from the END value. The multiplexers 424 and 426 change the inputs to the multiplier 430 respectively. For blend commands, the summer 422 has a nine-bit two's complement output which is fed to the multiplier 430. For colour correction commands, the END value (which also corresponds to the CONTRAST) is fed to the multiplier 430 when the sign bit is set positive. In blend commands, the second input of the multiplier 430 comes from the ramp generator 250 of FIG. 10 and has the effect of controlling the mixing proportion. In colour correction commands, the second input of the multiplier 430 comes from the commands pixel string. A new pixel to be colour corrected is loaded every non-stalled clock period. Only the top nine bits and the sign of the multiplier output are required. The output is a 10-bit two's complement number. Rounding is not performed as a one least significant bit error is considered acceptable.

The START_D output contains a delayed version of the START value for the next phase of the interpolator. In colour correction mode, the START value is equivalent to the BRIGHTNESS.

Phase B 450 of the interpolator 400 performs the second part of both of the blends, and colour correction calculations, namely for blends, D_OUT=C_MULT+START_D

=((END–START)*RAMP/256)+START for colour correction, D_OUT=(C_MULT*2)+ START_D

=((END_START)*RAMP/128)+START

It should be noted that rounding errors introduced by the multiplier 430 of phase A 420 lead to an error of one in the final value of the—blend. That is:

for END–START>0, D_OUT(FINAL)=END–1 for END–START<0, D_OUT(FINAL)=END+1.

The phase B circuit 450 comprises two multiplexers 452 and 454 both supplying a summer 458. The summer 458 supplies a limiter 460 which, in turn, supplies the output via a latch 462. The multiplexer 452 changes the inputs to the adder 458 to perform the multiplication by 2 for the colour correction function. The most significant bits pass straight through to the adder 458. For blend commands, this has the effect of sign-extending bit 8 by one position.

The multiplexer 454 adds an extra two inputs to the adder 458 to perform a sign-extension for the colour correction function, which uses a 8-bit signed format for the BRIGHTNESS. For blend commands, these two bits are set to 0, as the START value is unsigned. The adder 458 sums the two 10-bit signed numbers output from the multiplexes 452 and 454 to produce a 10-bit signed result, and a positive overflow indicator (POV). A negative overflow is not possible in either blend or colour correction modes. In blend mode, the start value is always positive, and in colour correction mode, the MULT value is always positive.

The adder 458 output is passed to the limiter 460 which is used to saturate values greater than 255 to 255, and values less than 0 to 0. This function can be disabled by an EFFECTS signal which comes from the COLOUR SOURCE field in the command. The limiter 460 has no effect in run or blend commands as the adder 458 output is always in the range 0 . . . 255. The output from the limiter 460 is latched (462) in every non-stalled clock period, in readiness for the next pipeline stage.

The limiter 460 is not shown in detail as its configuration can be readily derived from the above description. The limiter 460 has an input bus range from –128 to +638.

Figure 15:
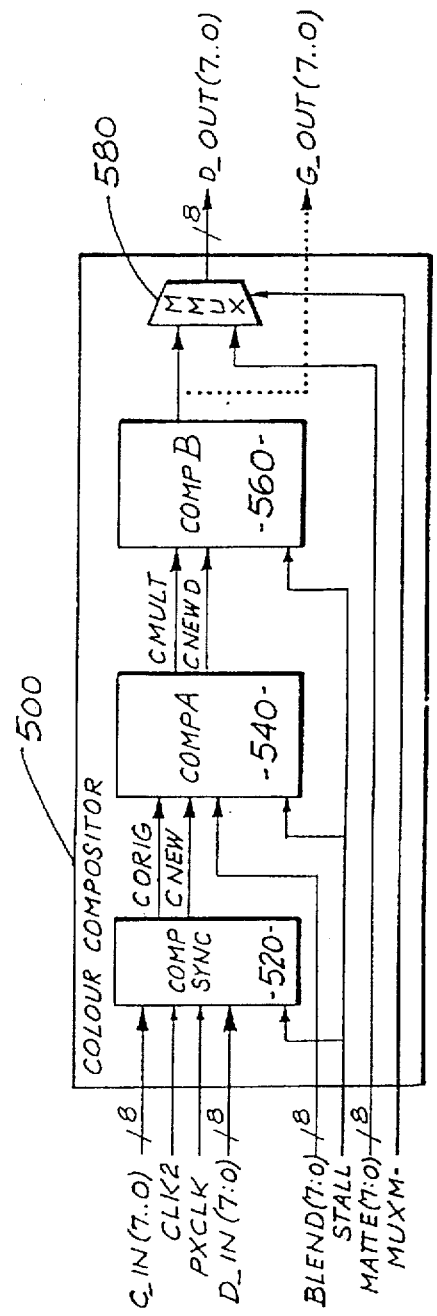
FIG. 15 is a schematic block diagram of one of the colour compositors of FIG. 2.

FIG. 15 shows a colour compositer 500 which includes four modules comprising a synchronisation module 520, a compositing phase A 540, a compositing phase B 560, and a matte multiplexer 580. The synchronisation module 520 is in stage 4 of the graphics pipeline. It latches the RGBM data from the external compositing or workscreen memory (28 or 30) and synchronises it with the pixel pipeline. Compositing phases, A and B 540, and 560 perform a blend between the original value in the external memory, and the new value from the corresponding interpolator 400. The proportion between original and new is controlled by the BLEND bus, which comes from the matte combiner 700. Two phases are again required in order to maintain one pixel per clock cycle phase. Phase A 540 is in stage 5 of the graphics pipeline and phase B 560 is in stage 6. The matte multiplexer 580 allows the data from the matte channel to be output on one or more of the colour planes. This is performed in stage 7 of the pipeline. The G OUT bus is shown shaded as it only exists in the green channel for use with the matte combiner 700.

The synchronisation module 520 is not shown in detail as it merely latches data from external memories to provide that data synchronously with the phase A unit 540. The STALL signal is delayed in this module by one clock period to compensate for the one clock delay when reading from the compositing or workscreen memory 28 or 30 as earlier noted.

Figure 16:
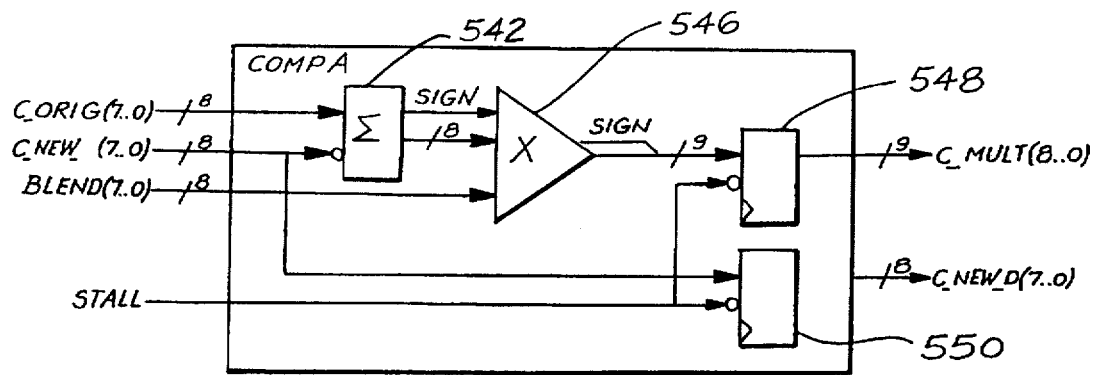
FIG. 16 is a schematic block diagram of compositor A of FIG. 15.

Phase A 540 of the compositor 500, seen in FIG. 16, performs the following calculation:

C_MULT=(C_ORIG-C_NEW)*BLEND/256.

Phase A 540 includes a summer 542, a multiplier 546 and output latches 548 and 550. All commands use the same format with 8-bit unsigned values on each of the NEW, ORIG, and BLEND inputs. The output from the adder 542, which, having an inverted input functions as a subtracter, is a 9-bit two's complement number which is fed to the multiplier 546. The second input to the multiplier 546 comes from the matte combiner 700 and has the effect of controlling the mixing proportion. A value of 0 represents a fully opaque compositing. Only the top 8 bits and the sign of the multiplier 456 output are required. The output is a 9-bit two's complement number. Rounding is again not performed as a one least significant bit error is considered acceptable. The NEW_D output contains, a delayed version of the NEW value for the next phase (560) of the compositor 500.

Figure 17:
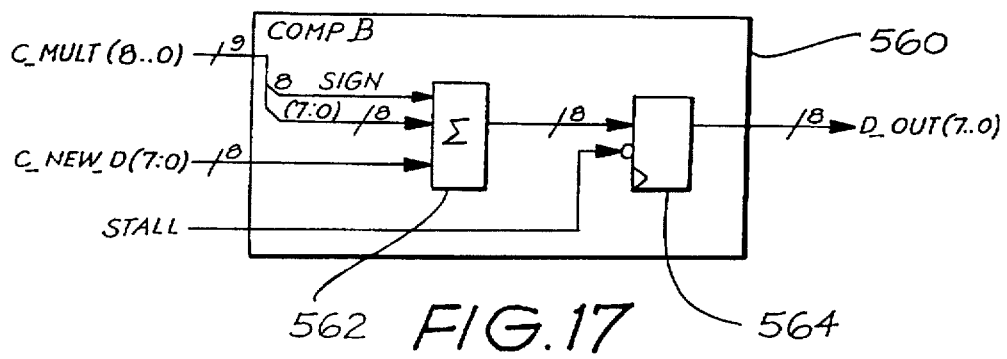
FIG. 17 is a schematic block diagram of the compositor B of FIG. 15.

Phase B 560 of the compositor 500 is shown in FIG. 17 and performs the following calculation:

D_MULT=C_MULT+C_NEW_D

=((ORIG-NEW)*BLEND/256)+C_NEW.

Note that rounding errors introduced by the multiplier 546, in phase A 540 lead to an error of at least one for non-opaque compositing. For example:

when ORIG-NEW>0,

D_OUT (fully transparent)=ORIG-1, when ORIG-NEW<0,

D_OUT (fully transparent)=ORIG+1.

Fully opaque compositing will always produce the exact NEW value. That is:

D_OUT(fully opaque)=NEW.

Phase B 560 includes an adder 562 which sums the 9-bit signed number from the multiplier 546 in phase A with the 8-bit unsigned value from the ORIG delay flip-flop 550 also in phase A 540. The result is always in the range 0 to 255 as the compositor 500 can only produce numbers between the ORIG and NEW values. The output from the adder 562 is accepted by latch 564 in every non-stalled clock period, in readiness for the output stage of the pipeline.

The transparency data path seen in FIG. 2 comprises a transparency interpolator 600 and a matte combiner 700. That data path performs two main functions, firstly to generate a transparency blend by interpolating between a START and END transparency, and to combine the transparency blend with the matte plane.

Figure 18:
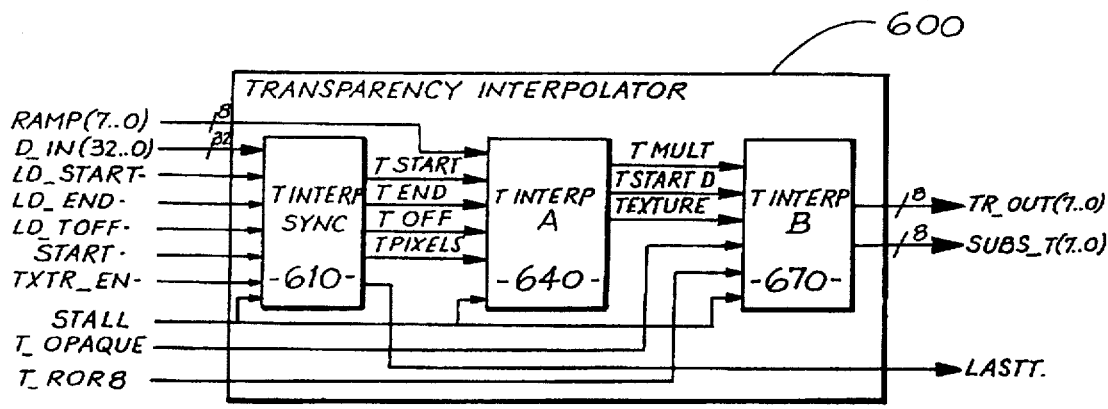
FIG. 18 is a schematic block diagram of the transparency interpolator of FIG. 2.

The transparency interpolator 600 is shown in FIG. 18 having three modules including a synchronisation module 610, an interpolation phase A 640, and an interpolation phase B 670. The synchronisation module 610 spans stages 0 and 1 of the pipeline. It holds operands for the current instruction, and latches operands for the next instruction. Phases A 640 and B 670 perform transparency blends and texturing. Again two phases are required in order to maintain one pixel per clock cycle. Phase A is in stage 2 of the pipeline and phase B is in stage 3.

Figure 19:
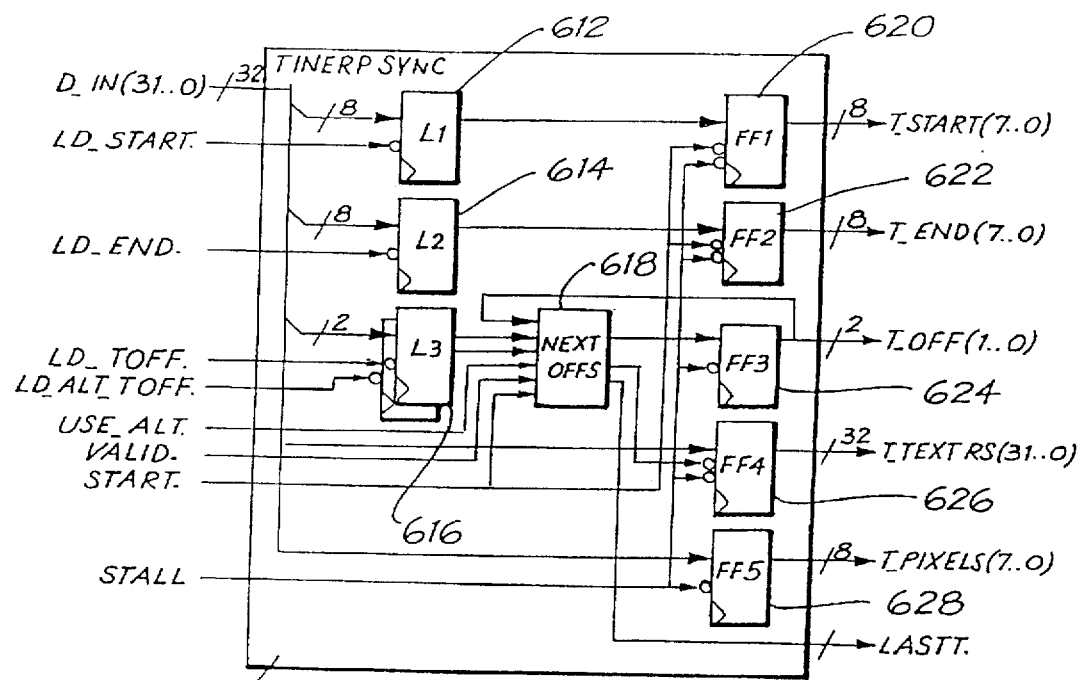
FIG. 19 is a schematic block diagram of the transparency interpolator synchroniser of FIG. 18.

FIG. 19 shows the various components within the synchronisation module 610. Latches 612 and 614 hold the START and END transparency parameters for the next instruction. This corresponds to stage 0 of the pipeline. Flip flops 620 and 622 load these values when the START signal indicates the first pixel of a new instruction is in progress. A third latch 616 holds the texture start parameter for the next instruction. This is a 2-bit parameter which determines the byte offset into the initial texture word for texture run and blend commands. It is loaded into a third flip-flop 624 via a next offset module 618 when the START signal indicates' the first pixel of an new instruction is in progress. A fourth flip-flop 626 holds the texture for up to four pixels in texture run and blend commands. The flip-flop 626 is loaded from the data bus D_IN in every fourth non-stalled clock period. A fifth flip-flop 628 holds the transparency for each pixel value in pixel string commands, and is loaded from the data bus in every non-stalled clock period.

Figure 20:
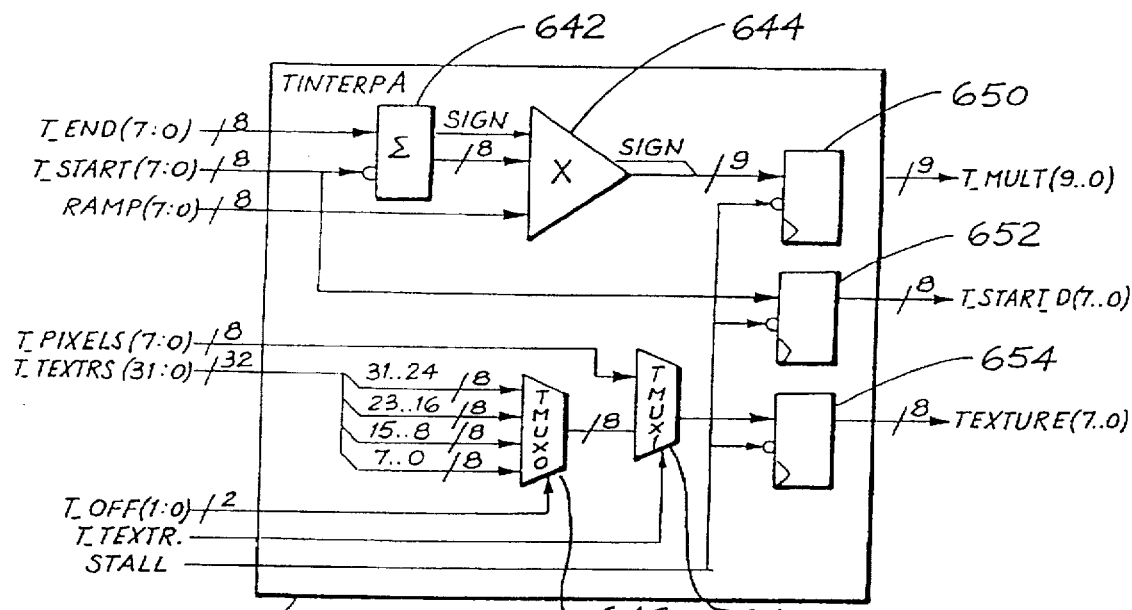
FIG. 20 is a schematic block diagram of the transparency interpolator A of FIG. 18.

The next offset module 618 is used to control the texture byte offset, and the texture word flip-flop 626. For texture run and blend commands, the texture byte offset is initialised when the START signal is asserted, and counts by one in other non-stalled clock periods. When the offset equals 3, the LASTT signal is asserted. The texture word flip-flop 626 enable signal is also asserted at this time as well as during the start cycle Phase A 640 of the interpolator 600 is shown in FIG. 20 and performs the following calculation:

T_MULT=(T_END-T_START)*RAMP/256.

Phase A 640 includes a summer 642 configured to subtract two input data bytes. The output of the summer 642 is a 9-bit two's complement output which is fed to a multiplier 644. The second input of the multiplier 644 comes from the ramp generator 150 of FIG. 10 and has the effect of controlling the mixing proportion between the start and end values. Only the top eight bits and the sign of the multiplier 644 output are required. The output is a 9-bit two's complement number. Again, rounding is not performed as one least significant bit error is considered acceptable. Phase A 640 also has a T_START_D output which contains a delayed version of the T_START value provided by a latch 652 for the next phase of the interpolator 600. A multiplexer 646 uses the T_OFF signal from the synchroniser 610 to select one of the four texture bytes in the T_PIXELS input. In texture run and blend commands, a different byte is selected in each pixel clock PXCLK period. In pixel string commands, the transparency is selected from the T_PIXELS input via a second multiplexer 648. The texture is latched (654.) to maintain synchronisation with pipeline stage 2.

Figure 21:
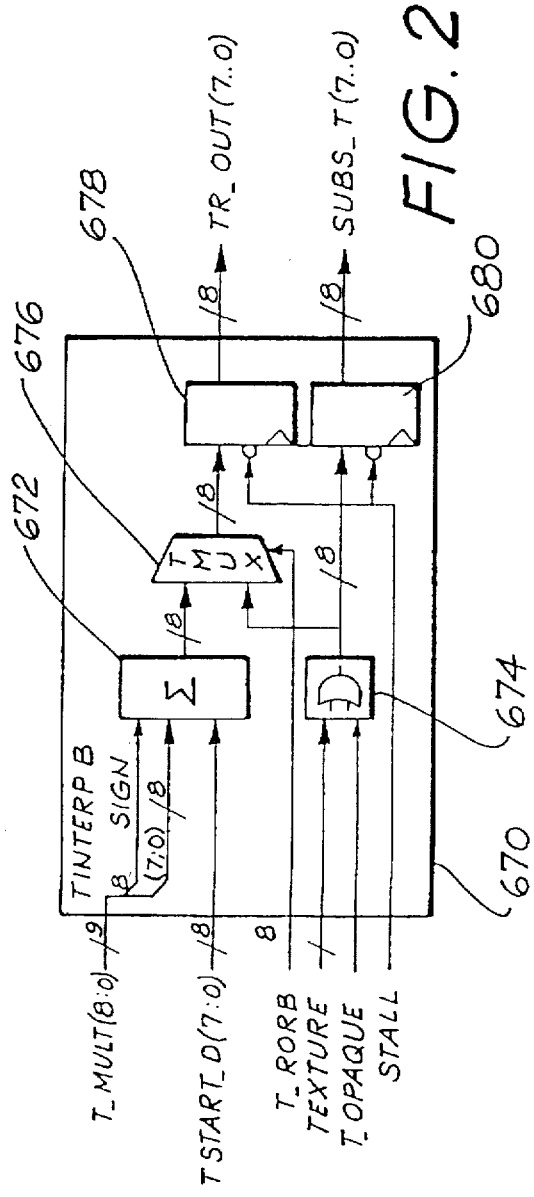
FIG. 21 is a schematic block diagram of the transparency interpolator B of FIG. 18.

Phase B 670 of the interpolator 600 is shown in FIG. 21 and performs the second part of blend calculations, namely:

TR_OUT=T_MULT+T_START_D

=((T_END-T_START)*RAMP/256+T-START.

Note that rounding errors introduced by the multiplier 644 in phase A 640 lead to an error of one in the final value of a blend. That is:

for T_END-T_START>0, TR_OUT(FINAL)=T_END-1 for T_END-T_START<0, TR_OUT(FINAL)=T_END+1

In FIG. 21, an adder 672 sums the 9-bit signed value from the multiplier 644 in FIG. 20 with the 8-bit start value. The result is always a positive 8-bit value since it must be in the range T_START...T_END. A multiplexer 676 selects the output of the adder 672 for run or blend commands, or the texture byte for other commands. In bitmap commands, and commands which do not have subsequent words, the opaque signal is asserted. This has the effect of forcing the texture to 25S (opaque).

The output from the multiplexer 676 is latched (678) in every non-stalled clock period, in readiness for the next pipeline stage. The transparency value from the output of the "opaqueing" module is also latched (680) and passed separately to the matte combiner The matte combiner 700 uses this value when the "matte source=subsequent" option is specified by the instruction set.

Figure 22:
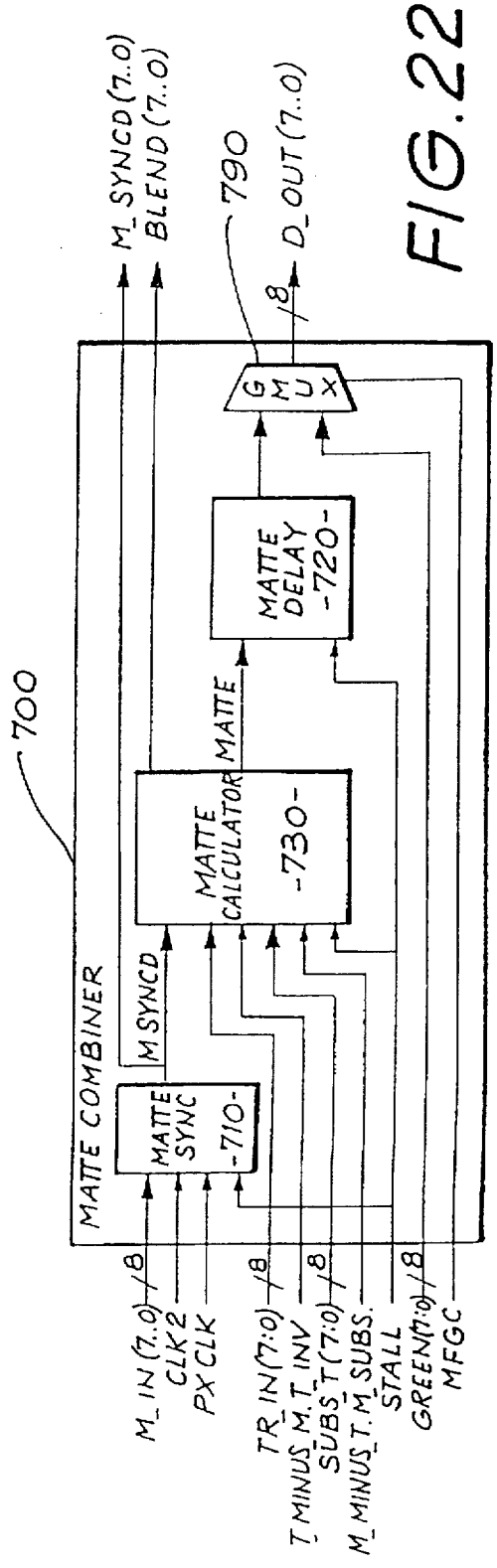
FIG. 22 is a schematic block diagram of the matte combiner of FIG. 2.

The matte combiner 700 is shown in FIG. 22 having four modules including a synchronisation module 710, a matte calculator 730, a matte delay 720, and a green multiplexer 790.

The synchronisation module 710 is in stage 4 of the pipeline. It latches the matte plane of the RGBM data from the external compositing 4 or workscreen 30 memory in the first half of the pixel clock period. Based on this value and the transparency from the transparency interpolator 600, the matte calculator 730 produces a blend value for the colour compositors 500, and a new matte value for the compositing memory 28. Matte calculations are performed in stage 4 of the pipeline. The delay 720 passes the matte value unchanged to the green multiplexer 790 to synchronise with the colour components which are calculated in stages 5 and 6. The green multiplexer 790 allows the data from the green channel (400, 500: FIG. 2) to be output on the matte plane of the compositing memory 4. This is performed in stage 7 of the pipeline.

FIG. 23 shows the components within the matte synchronisation module 710. A latch 712 produces a delayed version of the STALL signal to compensate for the one clock delay in the compositing memory 28. The input data from the external memory is asynchronous to the main internal pixel clock PXCLK. It is, however, synchronous to the CLK 2 signal which is used to derive the pixel clock via a NAND gate 714, so the phase is fixed. This data is latched (716) in the first half of the pipeline stage 4.

The matte calculator 730 is seen in FIG. 25 and performs two calculations:

BLEND=LIMIT (TR_IN−M_SYNCD)

M_OUT=LIMIT (M_SYNCD−TR_IN)

where LIMIT (a−b)=0, if a−b<0.

Both the TR_IN and the M_SYNCD inputs are 8-bit unsigned values. The components in the top half of FIG. 25 calculate the BLEND output which is used to control the mixing proportion in the colour compositors 500. An input to this block with a value of 0 represents fully transparent compositing. An output value of 0, however, represents fully opaque compositing. The BLEND value is calculated by substracting, using an adder 734, the matte data in the compositing (or workscreen) memory 28 from the transparency which has either a run, blend or texture value. A limiter 738 saturates this value to 0 if the result is negative, as indicated by the carry bit from the adder 734. A multiplexer 742 can bypass this calculation and select the input transparency if the T_MINUS_M input is not asserted (the T_MINUS_M signal is decoded from the command word in the control unit 300.) To compensate for the different input and output sense of the transparency, the multiplexer 742 is normally inverted by an EXOR block 750, or is passed straight through to the output via a latch 752 when the T_INV signal is asserted.

The components in the bottom half of FIG. 25 calculate the M_OUT output which is written into the matte plane. This value is calculated by subtracting, using an adder 736, the transparency from the matte data in the compositing (or workscreen) memory 4,30. A further limiter 740 saturates this value to 0 if the result is negative, as indicated by a carry from the adder 736. A subsequent multiplexer 746 can bypass this calculation and select the input transparency if the M_MINUS_T input is not asserted. A further multiplexer 748 selects the SUBS_T value if the matte source field of the instruction specifies "subsequent". Both the BLEND M_OUT VALUES are latched to synchronise to stage 4 of the pipeline;

The matte delay 720, seen in FIG. 24, passes the matte value unchanged to the green multiplexer 790 to synchronise with the components which are calculated in stage 5 and 6. A flip-flop 722 synchronises to stage 5, and a second flip-flop-754 synchronises to stage 6.

The address generator block 800 of FIG. 2 is responsible for providing read and write addresses for the compositing memory 4 and the workscreen memory!30. A read cycle and a write cycle are performed in each pixel clock period. Compositing memory 4 addresses are provided by a page—address generator within the address generator 800, and workscreen addresses are provided by a screen address generator also within the generator 800. The address generator 800 operates in a manner known to those skilled in the art in selecting appropriate addresses within the workscreen and compositing memories. Having selected the appropriate address, either the page or screen addresses are multiplexed as determined by read and write signals. The write addresses are passed through a five stage delay to compensate for delays through the colour and transparency data paths.

The write controller 900 of FIG. 2 performs three main tasks, namely:

1. To implement additional functionality required for "bitmap mode" instructions;
2. To provide appropriate pipeline delays of write control and other status information; and
3. To interface to the compositing memory 28 and the pan/zoom engine 9 handshake signals.

Like the address generator 800, the write controller 900 forms functions known to those skilled in the art and a detailed explanation is not required in the specification. Essentially, the write controller 900 includes three stages comprising a bit map shift, a status delay, and an I/O control unit. In bit map mode instructions, a single 32-bit word is used to enable or disable writes for up to 32 consecutive pixels. The status delay module provides appropriate pipeline delays of write control and other status information. It also contains a block which is used to detect when the pipeline is empty. The I10 controller interfaces to the compositing memory 4 and the pan/zoom engine 9 handshake signals.

The foregoing description provides an architecture by which a graphics engine 10 can be produced to achieve colour desktop publishing functions.

The preferred embodiment of the graphics engine is able to implement a wide range of commands so as to manipulate image data. Five such commands respectively known as CANVAS RUN, CANVAS BLEND, CANVAS PIXELS, CANVAS TEXTURE RUN and CANVAS TEXTURE BLEND will now be described.

The CANVAS RUN function composites a run of colours with the image, with compositing controlled by the transparency and the matte plane. This ' command simulates the interaction of paint with canvas or other textured materials, as textured dents in the background progressively "fill up" with "paint". The canvas run command composites the run length number of pixels of a colour equal to the start colour, starting at the page address. The intensity of compositing is controlled by the difference between the transparency run and the matte plane of the image. The matte plane is changed to be the difference between the matte value and the run transparency.

The operation is as follows for n=0 to Run_length-1

```
RGB(image)[address+n] =
((T(start).Matte(image)[address+n]*RGB(start) +
(256-(T(start).Matte(image)[address+n]))
*RGB(image)[address+n])/256
Matte(image)[address+n] =
Matte(image)[address+n].T(start)
``` where . represents a subtraction operation with underflow limiting.

The canvas run command is used for compositing object based constant colour "brush strokes" onto a textured background, where it is desirable to simulate the cumulative interaction between paint and a textured background. To achieve this effect, the page matte should contain an image which corresponds to the texture of the background.

The CANVAS BLEND function composites a blend of colours with the image, with compositing controlled by the blend transparency and the matte plane. This command simulates the interaction of paint with canvas or other textured materials, as textured dents in the background progressively "fill up" with "paint".

The canvas blend command composites the run length number of pixels of a colour smoothly changing from the start colour to the end colour with the image, starting at the page address. The intensity of compositing is controlled by the difference between the blended transparency and the matte plane of the image. The matte plane is changed to be the difference between the matte value and the blend transparency.

The operation is as follows for n=0 to Run/length-1

```
Interpolation[n] = n/(Run_length-1)
T[n] = Interpolation[n]*T(end) +
(1-Interpolation[n])*T(start)
RGB[n] = Interpolation[n]*RGB(end) +
(1-interpolation[n])*RGB(start)
RGB(image)[address+n] =
((T[n].Matte(image)[address+n])*RGB[n] +
(256-(T[n].Matte(image)[address+n]))
*RGB(image)[address+n])/256
Matte(image)[address+n] =
Matte(image)[address+n].T[n]
``` where . represents a subtraction operation with underflow limiting.

The canvas blend command is used for compositing object based blended colour "brush strokes" onto a textured background, where it is desirable to simulate the cumulative interaction between paint and a textured background. To achieve this effect the page matte should contain an image which corresponds to the texture of the background.

The CANVAS PIXELS function composites a run of pixels with the image, with compositing controlled by the pixel transparency and the matte plane. This command simulates the interaction of paint with canvas or other textured materials, as textured dents in the background progressively "fill up" with "paint".

The canvas pixels command composites the run length number of pixels with the image, starting at the page address. The intensity of compositing is controlled by the difference between the pixel transparency and the matte plane of the image. The matte plane is changed to be the difference between the matte value and the pixel transparency.

The operation is as follows for n=0 to Run_length-1

```
RGB (colour corrected)[n] =
Limit((RGB(contrast)*RGB(pixel)[n])/256+ RGB(bright))
RGB(image)[address+n] =
((T(pixel).Matte(image)[address+n])
*RGB(colour corrected)[n] +
(256-(T(pixel).Matte(image)[address+n]))
*RGB(image)[address+n])/256
Matte(image)[address+n] =
Matte(image)[address=n].T(pixel)
``` where . represents a subtraction operation with underflow limiting.

The canvas pixels command is used for compositing pixel based "brush strokes" onto a textured background, where it is desirable to simulate cumulative interaction between paint and a textured background. To achieve this effect, the page matte should contain an image which corresponds to the texture of the background. This command can also be used for simulating screen printing of a natural image onto a textured background.

The CANVAS TEXTURE RUN function composites a run of colours with the image, with compositing controlled by the texture and the matte plane. This command simulates the interaction of textured brush strokes with canvas or other textured materials, as textured dents in the background progressively "fill up" with "paint".

The canvas run command composites the run length number of pixels of a colour equal to the start colour, starting at the page address. The intensity of compositing is controlled by the difference between the i subsequent texture bytes and the matte plane of the image i The matte plane is changed to be the difference between the matte value and the texture bytes.

The operation is as follows for n,0 to Run_length-1

```
RGB(image)[address+n] =
((Texture[n].Matte(image)[address+n])*RGB (start) +
(256-(Texture[n].Matte(image)[address+n]))
*RGB(image)[address+n])/256
Matte(image)[address+n] =
Matte(image)[address+n].Texture[n]
``` where . represents a subtraction operation with underflow limiting.

The canvas texture run command is used for compositing textured object based constant colour "brush strokes" onto a textured background, where it is desirable to simulate the cumulative interaction between paint and a textured background. To achieve this effect, the page matte should contain an image which corresponds to the texture of the background, and the subsequent texture bytes should contain a texture which relates to the texture of the paint medium.

The CANVAS TEXTURE BLEND function composites a blend of colours with the image, with compositing controlled by the texture and the matte plane. This command simulates the interaction of textured brush strokes with canvas or other textured materials, as textured dents in the background progressively "fill up" with "paint".

The canvas blend command composites the run length number of pixels of a colour smoothly changing from the start colour to the end colour with the image. The intensity of compositing is controlled by the difference between the subsequent texture bytes and the matte plane of the image. The transparency values of the start and end colour are ignored. The matte plane is changed to be the difference between the matte value and the texture bytes.

The operation is as follows for n=0 to Blend_length−1

```
Interpolation[n] = n/(Run_length−1)
RGB[n] = Interpolation[n]*RGB(end) +
(1−Interpolation[n])*RGB(start)
RGB(image)[address+n] =
((Texture[n].Matte(image)[address+n])*RGB[n] +
(256−(Texture[n].Matte(image)[address+n]))
*RGB(image)[address+n])/256
Matte(image)[address+n] =
Matte(image)[address+n].Texture[n]
``` where . represents a subtraction operation with underflow limiting.

TABLE 1

| Bits 31:28 | Type | Instruction | Fields | Parameters |
|---|---|---|---|---|
| 1XXX | Compositing | COMPOSITE | Multiple | Multiple |
| 0000 | Synchronisation | NOP | — | — |
| 0001 | Synchronisation | WAIT | HW/SW/PL | — |
| 0010 | Configuration | LOAD ZOOM | — | Zoom ratios |
| 0011 | Configuration | LOAD CON-FIGURATION | — | Skip mode, write enables, mux enables |
| 0100 | Configuration | LOAD REGISTER | Register # | Register value |
| 0101 | — | spare | — | — |
| 0110 | — | spare | — | — |
| 0111 | Compositing | EXECUTE UCODE | — | — |

TABLE 2

| Bit # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Function | | | | | | | | | RE3 | RE2 | RE1 | RE0 | EX3 | EX2 | EX1 | EX0 |

TABLE 3

| Bit # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Function | | | | | | SBR | SBW | SER | SEW | M2R | M2G | M2B | WER | WEG | WEB | WEM |

TABLE 4

| Bit # | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Function | 0 | 1 | 1 | 1 | | | | | | | | | | | | |

| Bit # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Function | | R14 | R13 | R12 | R11 | R10 | R9 | R8 | R7 | R6 | R5 | R4 | R3 | R2 | R1 | R0 |

The canvas texture blend command is used for compositing textured object based constant colour "Brush strokes" onto a textured background, where it is desirable to simulate the cumulative interaction between paint and a textured background. To achieve this effect, the page matte should contain an image which corresponds to the texture of the background, and the subsequent texture bytes should contain a texture which relates to the texture of the paint medium.

It will be apparent to those skilled in the art that the above described functions result in the matte plane being changed by either the colour information (transparency) of the image or the texture information of the image. Subsequent manipulations are based on the changed matte plane.

The foregoing describes only one embodiment of the present invention, and modifications, obvious to those skilled in the art can be made thereto without the party from the scope of the present invention.

For example, many of the individual building blocks described include a latch or latches which are used to buffer data out of that respective unit. Those latches are only used in the present embodiment to enable synchronisation throughout the various pipeline stages through the graphics engine 10. With hardware that is capable of operating at much higher speeds, the processing delays within the various hardware items will become insignificant and the requirement for the latches will no longer be necessary.

TABLE 5

| Reg # | NAME | DESCRIPTION |
|---|---|---|
| 0 | ST_RED | Start value of red component for run or blend. Also used as red Brightness. |
| 1 | ST_GREEN | Start value of green component for run or blend. Also used as green Brightness. |
| 2 | ST_BLUE | Start value of blue component for run or blend. Also used as blue Brightness. |
| 3 | ST_TRANS | Start value of transparency component for run or blend. |
| 4 | ND_RED | End value of red component for run or blend. Also used as red Contrast. |
| 5 | ND_GREEN | End value of green component for run or blend. Also used as green Contrast. |
| 6 | ND_BLUE | End value of blue component for run or blend. Also used as blue Contrast. |
| 7 | ND_TRANS | End value of transparency component for run or blend. |
| 8 | P_START_H | Horizontal Page Start address. |
| 9 | P_START_V | Vertical Page Start address. |
| 10 | S_START_H | Horizontal Screen Start address. |
| 11 | S_START_V | Vertical Screen Start address. |
| 12 | UCODE | Microcode register. |
| 13 | ALT_RL | Alternate run length register. |
| 14 | T_OFF | texture offset register. |

TABLE 6

| Bit # | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Function | 0 | 0 | 0 | 1 | HWR | SWR | PLR | | | | | | | | | |

TABLE 7

| ADDRESS | MODE | NAME | SIZE | DESCRIPTION |
|---|---|---|---|---|
| 00 | WRITE | COMMAND | 32 | Command input |
| 01 | WRITE | CONTROL | 16 | general control |
| | READ | STATUS | 16 | general status |

TABLE 8

| Bit # | 31 | 30 | ... | 25 | 24 | 23 | 22 | ... | 17 | 16 | 15 | 14 | ... | 9 | 8 | 7 | 6 | ... | 1 | 0 |
|---|---|---|---|---|---|---|---|---|---|---|---|---|---|---|---|---|---|---|---|---|
| Instruction | | | | COMMAND | | | | | | | | T.O. | | | | R. | | L. | | |
| Operands | 7 | | R | | 0 | 7 | | G | | 0 | 7 | | B | | 0 | 7 | | T | | 0 |

TABLE 9

| Bit # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Function | HIE | SIE | EIE | CHI | CSI | CEI | RST | SWR | SEE | DE | TM5 | TM4 | TM3 | TM2 | TM1 | TM0 |

TABLE 10

| Bit # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Function | HIE | SIE | EIE | HIF | SIF | EIF | FFF | GR | DOE | TS3 | TS2 | TS1 | TS0 | V2 | V1 | V0 |

TABLE 11

| Type | Name | # inputs | # outputs | # bidirs | Description |
|---|---|---|---|---|---|
| 1960 | HCLK | 1 | — | — | 1960 Processor clock, 33 MHz |
| | RESET- | 1 | — | — | Power on reset |
| | HD (31 ... 0) | — | — | 32 | Host data bus |
| | CE- | 1 | — | — | chip enable |
| | RS | 1 | — | — | register select |
| | READ- | 1 | — | — | read enable |
| | DACK- | 1 | — | — | DMA acknowledge |
| | NEXT- | 1 | — | — | next DMA word enable |
| | DREQ- | — | 1 | — | DMA request |
| | INT- | — | 1 | — | interrupt request |
| Comp. Mem. | CLK2 | 1 | — | — | twice pixel clock, 27 MHz |
| | PXCLK | 1 | — | — | pixel clock, 13.5 MHz |
| | CD_OE- | 1 | — | — | compositing data bus output enable |
| | CD (31 ... 0) | — | — | 32 | compositing data bus |
| | LAD (12 ... 0) | — | 13 | — | compositing line address |
| | PAD (12 ... 0) | — | 13 | — | compositing pixel address |
| | BUFWI- | — | 1 | — | buffer write image |
| | BUFWM- | — | 1 | — | buffer write matte |
| | BUFR- | — | 1 | — | buffer read |
| pan/ zoom | GFX_ST- | — | 1 | — | start of graphics run |
| | VERT- | — | 1 | — | screen vertical run |
| | LD_ZOOM- | — | 1 | — | load zoom ratios |
| | SC_WE- | — | 4 | — | screen byte lane |

TABLE 11-continued

| Type | Name | # inputs | # outputs | # bidirs | Description |
|---|---|---|---|---|---|
| | (3 ... 0) | | | | write enables |
| | SC_READ | — | 1 | — | screen read |
| | SC_WRITE | — | 1 | — | screen write |
| | SC_RDACK- | 1 | — | — | screen read data acknowledge |
| | SC_WDACK- | 1 | — | — | screen write data acknowledge |
| other | TESTIN | 1 | — | — | test mode input |
| | TESTOUT | — | 1 | — | test mode output |
| | ERR- | — | 1 | — | error indicator |
| | GFX RUN- | — | 1 | — | graphics engine running indicator |
| | RESTART- | 1 | — | — | restart command from VINEGAR |
| | TEST(2:0) | 3 | — | — | test inputs |
| | TEST3 | — | 1 | — | test output |

What is claimed is:

1. Ramp generator apparatus comprising:

means for inputting a plurality of input bits to said apparatus;

means for receiving said input bits and storing a predetermined number N as a plurality of bits of information;

generating means for receiving said bits of information and generating a ramp output of said ramp generator apparatus between a predetermined minimum and a predetermined maximum; and means for receiving the most significant of said bits of information and to cause said generating means, based on the received most significant bit, to operate in one of a step mode or a jump mode, whereby in said step mode, said ramp output increases at a rate less than 1:1 and in said jump mode, said ramp output increases at a rate equal to or in excess of 1:1, the value of said number N determining the real time taken for said ramp output to traverse between said minimum and said maximum.

2. Apparatus as claimed in claim 1, wherein said number N represents a run length of a graphics instruction, and wherein said predetermined minimum is 0% of the interpolation range and said predetermined maximum is 100% of the interpolation range.

3. Apparatus as claimed in claim 1, wherein said number N includes at least 8 bits and wherein said means for receiving establishes said step mode if said number is greater than 255 or said jump mode if said number is less than or equal to 255.

4. Apparatus as claimed in claim 1, wherein said generating means comprises a first module for calculating 255/(N−1), a second module for calculating (511−N), and a third module for calculating (512−2N), and further comprising (i) a first multiplexer connected to a zero value and an output of said second module, (ii) a second multiplexer connected to a constant value (510) and an output of said third module, (iii) a third multiplexer having inputs connected to an output of said first module and an output of said second multiplexer, (iv) an adder having one input supplied by an output of said third multiplexer, said adder outputting to a first input of a fourth multiplexer, a second input of said fourth multiplexer being connected to an output of said first multiplexer, and (v) a flip flop connected to an output of said fourth multiplexer, an output of said flip flop being supplied as an output of said ramp generator and to a second input of said adder.

5. Apparatus as claimed in claim 4, wherein said generating means further comprises counter means connected to said output of said flip-flop and having a count value incremented thereby, and a fifth multiplexer having a first input connected to a count value output of said counter means and a second input connected to said output of said flip-flop, an output of said fifth multiplexer being switchable between (i) said count value to provide a step mode ramp output and (ii) said flip-flop output to provide an alternate, jump mode output.

6. Graphics apparatus to manipulate color image data on a pixel-by-pixel basis, said apparatus comprising:

input means for inputting color image data and matte plane data;

control unit;

a parallel data path for each one of three primary colors of the input color image data, each said data path comprising a cascade-connected color interpolator and compositor, said data paths being connected in parallel with a cascade-connected transparency interpolator and matte combiner, each of said color interpolators receiving color variation commands from said control unit, each of said compositors receiving the input color image data for each said pixel in turn from said input means, said compositors transforming the input color image data in accordance with a predetermined function the output of which is dependent upon both the input color image data and the interpolator color variation command received from said control unit, said transparency interpolator receiving transparency variation commands from said control unit, said matte combiner receiving matte plane input data for each said pixel from said input means, said matte combiner producing a color blend value and an output matte value for each said pixel by transforming said matte plane input data in accordance with said transparency variation commands, an output of said graphics apparatus being color image data simultaneously manipulated as color, transparency, and matte, each color variation command including a start value and an end value, said input color image data being interpolated between the start value and the end value for a specific duration determined by the color variation command; and a controller, coupled to said control unit and to an input of said data paths, for providing a ramp signal to said at least one data path, said controller comprising a ramp generator coupled to the input of said at least one said data path, said ramp generator including:

means for inputting a plurality of input bits;

means for receiving said input bits and storing a predetermined number N corresponding to said specific duration, as a plurality of bits of information;

generating means for receiving said bits of information and generating said ramp signal between a predetermined minimum and a predetermined maximum; and means for receiving the most significant of said bits of information and to cause said generating means, based on the received most significant bit, to operate in one of a step mode or a jump mode of operation, whereby in said step mode, said ramp signal increases at a rate less than 1:1 and in said jump mode, said ramp signal increases at a rate equal to or in excess of 1:1, a value of said number N determining the real time taken for said ramp signal to traverse between said predetermined minimum and said predetermined maximum.

7. Graphics apparatus to manipulate color image data on a pixel-by-pixel basis, said comprising:

input means for inputting color image data and matte plane data;

a control unit;

a parallel data path for each one of three primary colors of the input color image data, each said data path comprising a cascade-connected color interpolator and compositor, said data paths being connected in parallel with a cascade-connected transparency interpolator and matte combiner, each of said color interpolators receiving color variation commands from said control unit, each of said compositors receiving the input color image data for each said pixel in turn from said input means, said compositors transforming the input color image data in accordance with a predetermined function the output of which is dependent upon both the input color image data and the interpolator color variation command received from said control unit, said transparency interpolator receiving transparency variation commands from said control unit, said matte combiner receiving matte plane input data for each said pixel from said input means, said matte combiner producing a color blend value and an output matte value for each said pixel by transforming said matte plane input data in accordance with said transparency variation commands, an output of said graphics apparatus being color image data simultaneously manipulated as color, transparency, and matte, the transparency variation commands including a start value and an end value, said matte plane inert data being interpolated between the start value and the end value for a specific duration determined by the transparency variation commands; and a controller, coupled to said control unit and to said data paths, for providing a ramp signal to said at least one data path, said controller comprising a ramp generator coupled to the input of said at least one said data path, said ramp denigrator including:

means for inputting a plurality of input bits;

means for receiving said input bits and storing a predetermined number N corresponding to said specific duration, as a plurality of bits of information;

generating means for receiving said bits of information and generating said ramp signal between a predetermined minimum and a predetermined maximum; and means for receiving the most significant of said bits of information and to cause said generating means, based on the received most significant bit, to operate in one of a step mode or a jump mode of operation, whereby in said step mode, said ramp signal increases at a rate less than 1:1 and in said jump mode, said ramp signal increases at a rate equal to or in excess of 1:1, a value of said number N determining the real time taken for said ramp signal to traverse between said predetermined minimum and said predetermined maximum.

* * * * *

UNITED STATES PATENT AND TRADEMARK OFFICE
CERTIFICATE OF CORRECTION

PATENT NO. : 5,677,644  
DATED : October 14, 1997  
INVENTOR(S) : KIA SILVERBROOK, ET AL.

Page 1 of 3

It is certified that error appears in the above-identified patent and that said Letters Patent is hereby corrected as shown below:

On the title page, items

At [57] ABSTRACT

Line 5, "data" should read --data.--.

At [75] Inventors

"Metcalf" should read --Metcalfe--.

Column 2

Line 33, "Fig.  " should read --FIG. 7;--.

Column 3

Line 9, "10" should read --10'--.

Column 11

Line 27, "10)." should read --10.--.

Column 13

Line 1, "a! so" should read --also--.

UNITED STATES PATENT AND TRADEMARK OFFICE
CERTIFICATE OF CORRECTION

PATENT NO. : 5,677,644

DATED : October 14, 1997

INVENTOR(S) : KIA SILVERBROOK, ET AL.

It is certified that error appears in the above-identified patent and that said Letters Patent is hereby corrected as shown below:

Column 14

Line 60, "(flip-flop) should read --flip flop--.
    Line 67, "(flip-flop) should read --flip flop--.

Column 15

Line 5, "(flip-flop should read --flip flop--.
    Line 6, "292)" should read --292--.
    Line 8, "(flip-flop)" should read --flip flop--.

Column 16

Line 11, "the-blend." should read --the blend.--

Column 17

Line 43, "a!so" should read --also--.

Column 18

Line 23, "cycle" should read --cycle.--.

Column 19

Line 8, "combiner" should read --combiner 700.--

UNITED STATES PATENT AND TRADEMARK OFFICE
CERTIFICATE OF CORRECTION

PATENT NO. : 5,677,644
DATED : October 14, 1997
INVENTOR(S) : KIA SILVERBROOK, ET AL.

It is certified that error appears in the above-identified patent and that said Letters Patent is hereby corrected as shown below:

<u>Column 20</u>

Line 10, "pipeline;" should read --pipeline.--
    Line 18, "memory!30" should read --memory 30.--.
    Line 64, " ' " should be deleted.

<u>Column 22</u>

Line 35, "i" should read --i.--.

Signed and Sealed this

Twenty-first Day of July, 1998

Attest:

BRUCE LEHMAN

Attesting Officer      Commissioner of Patents and Trademarks